(12) United States Patent
Jeong

(10) Patent No.: US 11,192,098 B2
(45) Date of Patent: Dec. 7, 2021

(54) ION EXCHANGE MEMBRANE AND METHOD FOR MANUFACTURING SAME

(71) Applicant: AMOGREENTECH CO., LTD., Gyeonggi-do (KR)

(72) Inventor: Ui Young Jeong, Incheon (KR)

(73) Assignee: AMOGREENTECH CO., LTD., Gyeonggi-Do (KR)

( * ) Notice: Subject to any disclaimer, the term of this patent is extended or adjusted under 35 U.S.C. 154(b) by 221 days.

(21) Appl. No.: 15/760,440

(22) PCT Filed: Sep. 19, 2016

(86) PCT No.: PCT/KR2016/010423
§ 371 (c)(1),
(2) Date: Mar. 15, 2018

(87) PCT Pub. No.: WO2017/048103
PCT Pub. Date: Mar. 23, 2017

(65) Prior Publication Data
US 2019/0022634 A1    Jan. 24, 2019

(30) Foreign Application Priority Data

Sep. 15, 2015  (KR) .......................... 10-2015-0130034
Sep. 15, 2015  (KR) .......................... 10-2015-0130035
Sep. 15, 2015  (KR) .......................... 10-2015-0130036

(51) Int. Cl.
*B01J 47/127* (2017.01)
*H01M 50/44* (2021.01)
(Continued)

(52) U.S. Cl.
CPC .......... *B01J 47/127* (2017.01); *B01D 67/002* (2013.01); *B01D 67/0004* (2013.01);
(Continued)

(58) Field of Classification Search
None
See application file for complete search history.

(56) References Cited

U.S. PATENT DOCUMENTS 5,618,433 A * 4/1997 Tarbet ...................... B01J 45/00
210/634
2010/0227247 A1 * 9/2010 Pintauro ............. H01M 8/1044
429/479

(Continued)

FOREIGN PATENT DOCUMENTS

JP      2005285549       10/2005
JP      2009202116        9/2009
(Continued)

OTHER PUBLICATIONS

Machine translation of Kawakatsu (JP 2009202116A), pp. 1-8. (Year: 2009).*

(Continued)

*Primary Examiner* — Clare M Perrin
(74) *Attorney, Agent, or Firm* — Norton Rose Fulbright US LLP

(57) ABSTRACT

A method for manufacturing an ion exchange membrane is provided. The method for manufacturing an ion exchange membrane, according to one embodiment of the present invention, comprises the step of electrospinning a support fiber producing solution and an ion exchange fiber producing solution respectively to prepare a laminate in which a support fiber mat consisting of a support fiber and an ion exchange fiber mat consisting of an ion exchange fiber are alternatively laminated. According to the present invention, it is possible to simply control factors, such as the thickness, electroconductivity and mechanical strength of the membrane, and the diameter/ratio of a pore, etc. to be suitable for the use of ion exchange membrane during the manufacturing process, to simplify the manufacturing process. As such, the (Continued)

ion exchange membrane manufactured by the method can be utilized as a universal ion exchange membrane which has a large ion exchange capacity, a small electrical resistance, and a small diffusion coefficient as well as excellent mechanical strength and durability.

5 Claims, 6 Drawing Sheets

(51) Int. Cl.
| | |
|---|---|
| H01M 50/403 | (2021.01) |
| H01M 50/411 | (2021.01) |
| H01M 50/449 | (2021.01) |
| C08L 101/00 | (2006.01) |
| D04H 1/728 | (2012.01) |
| B01D 69/02 | (2006.01) |
| C08J 5/22 | (2006.01) |
| B01D 67/00 | (2006.01) |
| B01D 69/12 | (2006.01) |
| B01D 69/10 | (2006.01) |
| H01M 8/0221 | (2016.01) |
| C02F 1/469 | (2006.01) |
| B01D 71/34 | (2006.01) |

(52) U.S. Cl.
CPC ............ *B01D 69/02* (2013.01); *B01D 69/10* (2013.01); *B01D 69/12* (2013.01); *C08J 5/2275* (2013.01); *C08L 101/00* (2013.01); *D04H 1/728* (2013.01); *H01M 8/0221* (2013.01); *H01M 50/403* (2021.01); *H01M 50/411* (2021.01); *H01M 50/44* (2021.01); *H01M 50/449* (2021.01); *B01D 71/34* (2013.01); *B01D 2323/39* (2013.01); *B01D 2325/18* (2013.01); *B01D 2325/42* (2013.01); *C02F 1/4691* (2013.01); *C02F 1/4693* (2013.01); *C08J 2333/12* (2013.01); *Y02P 70/50* (2015.11)

(56) References Cited

U.S. PATENT DOCUMENTS

| | | | |
|---|---|---|---|
| 2011/0114554 A1* | 5/2011 | Li | B01D 39/1623 210/493.5 |
| 2013/0115504 A1* | 5/2013 | Lee | H01M 8/20 429/101 |
| 2014/0038076 A1* | 2/2014 | Pintauro | B29C 48/142 429/480 |

FOREIGN PATENT DOCUMENTS

| | | |
|---|---|---|
| JP | 2009202116 A * | 9/2009 |
| JP | 2009245639 | 10/2009 |
| JP | 2010095825 | 4/2010 |
| KR | 10-2007-0019868 | 2/2007 |
| KR | 10-2011-0120185 | 11/2011 |
| KR | 10-2013-0049077 | 5/2013 |
| KR | 10-1422918 | 3/2014 |
| KR | 10-2014-0103866 | 8/2014 |
| KR | 20140103866 | 8/2014 |
| KR | 10-2014-0137198 | 12/2014 |
| KR | 20140137194 | 12/2014 |
| KR | 10-2015-0017298 | 2/2015 |

OTHER PUBLICATIONS

Ryu et al. (Journal of Hazardous Materials, 2012, 221-222, 248-255. (Year: 2012).*
International Search Report and Written Opinion Issued in Corresponding PCT Application No. PCT/KR2016/010423, dated Feb. 13, 2017.

* cited by examiner es significantly lowered. Further, there has been a problem in that it is very difficult to change configuration, for example, to control factors such as a film thickness, electrical conductivity, mechanical strength, and pore diameter/ratio and the like according to the purpose in the manufacturing process of the ion exchange membrane.

Accordingly, there is an urgent need for the development of a universal ion exchange membrane of which the structure and physical properties are easily changed according to the purpose only through a simplified process, and which has a large ion exchange capacity, a small electrical resistance and diffusion coefficient, and excellent mechanical strength and durability, and for a process by which the aforementioned ion exchange membrane may be easily implemented.

ION EXCHANGE MEMBRANE AND METHOD FOR MANUFACTURING SAME

CROSS-REFERENCE TO RELATED APPLICATIONS

This application is a national phase application under 35 U.S.C. § 371 of International Application No. PCT/KR2016/010423, filed Sep. 19, 2016, which claims priority to Korean Application No. 10-2015-0130034, filed Sep. 15, 2015, Korean Application No. 10-2015-0130035, filed Sep. 15, 2015, and Korean Application No. 10-2015-0130036, filed Sep. 15, 2015. The contents of the referenced applications are incorporated into the present application by reference.

FIELD OF THE DISCLOSURE

The present invention relates to an ion exchange membrane, and more specifically, to an ion exchange membrane which is implemented by a simplified manufacturing process and a shortened manufacturing time, has excellent mechanical strength and durability, a large ion exchange capacity, and a small electrical resistance and diffusion coefficient, and a method of manufacturing the same.

DESCRIPTION OF RELATED ART

An ion exchange resin is a synthetic resin having ion exchange capacity. In 1935, B. A. Adams and F. L. Holmes in the UK found that a resin prepared by condensation of polyvalent phenols with formaldehyde and a resin prepared by condensation of m-phenylenediamine and formaldehyde exchanged ions. It turned out that various ions in water can be removed by this resin. Thereafter, systematic research and production on an industrial scale for the resin started in Germany and the United States. During World War II, the resin was used in water purification, in copper and ammonia recovery in artificial silk factories and the like in Germany, and was used to classify fission products, ultra-uranium elements, rare earth elements, and the like in the United States. Further, purification of various substances (amino acids, antibiotics, etc.) was facilitated by the ion exchange resin, and the ion exchange resin became more important in terms of electrochemistry when an ion exchange membrane was developed. Currently, the ion exchange membrane is widely used in the fields of fuel cells, redox flow batteries, electrodialysis, desalination, treatment of ultrapure water and wastewater treatment, etc. In particular, the ion exchange membrane has been attracting worldwide attention as a clean technology for producing environmentally friendly renewable energy because the ion exchange membrane particularly reduces the use of fossil fuels. Currently, due to the rapid increase in the use of electronic products such as small notebooks and mobile phones, there is a need for the development of long-lifetime and high-capacity batteries and the development of new fuel cells, and thus research on the ion exchange membrane, which is a core material of the above-described batteries and cells, has been actively carried out.

Further, a typical ion exchange membrane often includes a separate support for improving mechanical properties, and specifically, an ion exchange resin layer in the form of a sheet may be provided on one surface of the support. Due to the problem of compatibility attributable to materials of the support and the ion exchange resin layer, peeling and separation frequently occur between the interfaces of layers, and thus an ion exchange capacity and/or mechanical prop-

SUMMARY OF THE INVENTION

An aspect of the present invention is directed to a method of manufacturing an ion exchange membrane in which it is possible to simply control factors, such as the thickness, electroconductivity, and mechanical strength of the membrane, and pore diameter/ratio, etc. to be suitable for the purpose during the manufacturing process of the ion exchange membrane, and to simplify the manufacturing process by allowing a filling process of an ion exchange solution to be omitted, etc.

Another aspect of the present invention is directed to a universal ion exchange membrane which has a large ion exchange capacity, a small electrical resistance and diffusion coefficient, and excellent mechanical strength and durability.

According to a first aspect of the present invention, there is provided a method for manufacturing an ion exchange membrane, including (1) electrospinning a support fiber producing solution and an ion exchange fiber producing solution respectively to prepare a laminate in which a support fiber mat formed by accumulating a support fiber and an ion exchange fiber mat formed by accumulating an ion exchange fiber are alternately stacked.

According to one embodiment of the present invention, the support fiber producing solution may include a support fiber producing component at 5 to 30 wt %

Further, the ion exchange fiber producing solution may include a cationic ion exchange fiber producing component or an anionic ion exchange fiber producing component at 5 to 60 wt %.

Further, the ion exchange fiber producing solution may include a first ion exchange fiber producing solution containing a cationic ion exchange fiber producing component and a second ion exchange fiber producing solution containing an anionic ion exchange fiber producing component, and each of the first ion exchange fiber producing solution and the second ion exchange fiber producing solution may be electrospun to form separate ion exchange fiber mats.

Further, after Step (1), the method may further include (2) melting at least a portion of a support fiber included in the support fiber mat by applying heat and pressure to the laminate, and allowing at least a portion of the melted support fiber to permeate into pores of the ion exchange fiber mat.

Here, a melting point of the support fiber may be lower than a melting point of the ion exchange fiber.

Further, the present invention provides an ion exchange membrane, including support fiber mats and ion exchange fiber mats alternately stacked.

According to one preferred embodiment of the present invention, one or more fiber mats of the support fiber mat and the ion exchange fiber mat may include a web region having a three-dimensional network structure formed by fusing fibers.

Further, the surface portions of the support fiber mat and the ion exchange fiber mat facing each other may include regions where the support fibers and the ion exchange fibers are mixed and physically bonded.

Further, an average diameter of the support fiber included in the support fiber mat may be in a range of 0.1 to 100 μm, an average diameter of the ion exchange fiber included in the ion exchange fiber mat may be in a range of 100 to 2000 nm, an average pore diameter of a single support fiber mat may be in a range of 0.1 to 10 μm, an average pore diameter of a single ion exchange fiber mat may be in a range of 0.1 to 1 μm, a thickness of the single support fiber mat may be in a range of 0.1 to 200 μm, and a thickness of the single ion exchange fiber mat may be in a range of 0.1 to 10 μm. Here, the ion exchange membrane may be used for a liquid filter and an air filter.

Further, the present invention provides an ion exchange membrane, including support fiber mats and ion exchange fiber mats alternately stacked, wherein at least a portion of a surface of one ion exchange fiber of ion exchange fibers provided in the ion exchange fiber mat includes a fused part in which a support fiber provided in a support fiber mat disposed to adjoin the surface of the ion exchange fiber mat is melted and fused.

According to one embodiment of the present invention, a weight ratio of the support fiber mat to the ion exchange fiber mat may be in a range of 1:0.8 to 1.5, and a thickness ratio of a single support fiber mat and a single ion exchange fiber mat may be in a range of 1:0.2 to 0.8.

Further, the ion exchange membrane may be used for a liquid filter, an air filter, a capacitive deionization (CDI) device, or electrodialysis (ED).

Further, the present invention provides an ion exchange membrane, including: an ion exchange fiber mat; and a supporter for supporting an ion exchange fiber by filling spaces between fibers of the ion exchange fiber mat.

According to one embodiment of the present invention, the ion exchange membrane may be used for a battery separator.

According to a second aspect of the present invention, there is provided a method for manufacturing an ion exchange membrane, including (I) preparing a fiber mat by electro spinning a spinning solution containing a support component and an ion exchangeable component.

According to one embodiment of the present invention, the ion exchangeable component may be a cationic ion exchangeable component or an anionic ion exchangeable component.

Further, the spinning solution may include the ion exchangeable component at 20 to 80 parts by weight based on 100 parts by weight of the support component.

Further, after Step (I), the method may further include (II) applying heat and pressure to the fiber mat to control a porosity and a pore diameter.

Further, a melting point of the support component included in the fiber mat may be lower than a melting point of the ion exchangeable component.

Further, the present invention provides an ion exchange membrane including a fiber mat which includes a first fiber containing a support component and an ion exchangeable component.

According to one embodiment of the present invention, the fiber mat may further include a second fiber containing a support component and a third fiber containing an ion exchangeable component.

Further, the fiber mat may include a web region having a three-dimensional network structure formed by fusing fibers.

Further, an average diameter of the fiber included in the fiber mat may be in a range of 0.1 to 100 μm, an average pore diameter of the fiber mat may be in a range of 0.1 to 10 μm, and a thickness of the fiber mat may be in a range of 0.1 to 200 μm.

Here, the ion exchange membrane may be used for a liquid filter and an air filter.

Further, the present invention provides an ion exchange membrane including a fiber mat which includes a third fiber containing an ion exchangeable component; and a support for supporting the third fiber by filling spaces between the fibers in the fiber mat.

According to one embodiment of the present invention, the ion exchange membrane may be used for a liquid filter, an air filter, a capacitive deionization (CDI) device, electrodialysis (ED), or a battery separator.

According to a third aspect of the present invention, there is provided a method for manufacturing an ion exchange membrane, including (A) electrospinning a first support fiber producing solution to form a first support fiber mat; (B) spraying an ion exchange solution onto the first support fiber mat to fill the support fiber mat with the ion exchange solution; and (C) electrospinning a second support fiber producing solution on the first support fiber mat on which the ion exchange solution is sprayed to form a second support fiber mat.

According to one embodiment of the present invention, after Step (C), the method may further include (D) spraying an ion exchange solution onto the second support fiber mat to fill the support fiber mat with the ion exchange solution.

Further, the first support fiber producing solution and the second support fiber producing solution may independently include support fiber producing components, and the support fiber producing components may be the same or different.

Further, the first support fiber producing solution and the second support fiber producing solution may independently include the support fiber producing component at 5 to 30 wt %.

Further, the ion exchange solution may include a cationic ion exchangeable component or an anionic ion exchangeable component at 0.1 to 99 wt %.

Further, in one or more steps of Steps (B) and (D), the ion exchange solution may be sprayed into the support fiber mat so that the ion exchange solution overflows.

Further, after Step (C) or (D), the method further includes (E) applying heat and pressure to compress the first support fiber mat and the second support fiber mat so that the ion exchange solution permeates into voids remaining in the support fiber mat.

Further, the present invention provides an ion exchange membrane including a plurality of stacked support fiber mats; and an ion exchangeable component filling in spaces between fibers of a plurality of the support fiber mats.

Further, the present invention provides an ion exchange membrane, including a plurality of stacked support fiber mats; an ion exchangeable component filling in spaces between fibers of a plurality of the support fiber mats; and an ion exchange layer interposed between adjoining mats among a plurality of the support fiber mats and including the ion exchangeable component.

According to one embodiment of the present invention, at least one of a plurality of the support fiber mats may include a web region having a three-dimensional network structure formed by fusing fibers.

Further, a thickness of a single support fiber mat may be in a range of 0.1 to 200 µm, and an average diameter of a support fiber included in the support fiber mat may be in a range of 0.1 to 100 µm, and an average pore diameter of a single support fiber mat may be in a range of 0.1 to 10 µm.

Further, the ion exchange layer may be formed by an ion exchangeable component which overflows from spaces between fibers of at least one of the first support fiber mat and the second support fiber mat.

Further, the total weight of each of the support fiber mat and the ion exchangeable component may be in a weight ratio of 1:0.5 to 0.9.

Further, the present invention provides a battery separator including the ion exchange membrane described above.

Further, the present invention provides a fuel cell or a redox flow battery including the battery separator described above.

Hereinafter, the terms used in the present invention will be described.

The term "surface portion" of the mat as used in the present invention refers to a region corresponding to a thickness of 15% or less of the total thickness of the mat from a mat surface.

Further, the term "mat" as used in the present invention refers to a state in which electrospun fibers have been accumulated. The mat may be formed by a single strand of fiber being bent and entangled several times or a plurality of strands of fiber being bent and entangled with each other, and a fiber which includes a fibrous portion, even though the fiber is partially melted and includes a non-fibrous portion, may be considered as a "mat".

According to the present invention, electrical conductivity, mechanical strength, porosity and the like can be easily adjusted according to characteristics required for the purpose of the ion exchange membrane, and since an ion exchange solution filling process is omitted, the ion exchange membrane can be mass-produced through a more simplified process, and productivity can be significantly increased. Further, there is an effect in that the filling property of the ion exchangeable component in the supporter is significantly increased, and thus the prepared ion exchange membrane has excellent mechanical strength and durability, and has a large ion exchange capacity and a small electrical resistance and diffusion coefficient such that the ion exchange membrane can be widely applied to separators in the field of batteries, desalination systems such as CDI/ED, materials for various filters and the like, and may be more suitable for use in a battery separator.

DETAILED DESCRIPTION OF THE INVENTION

Figure 1:
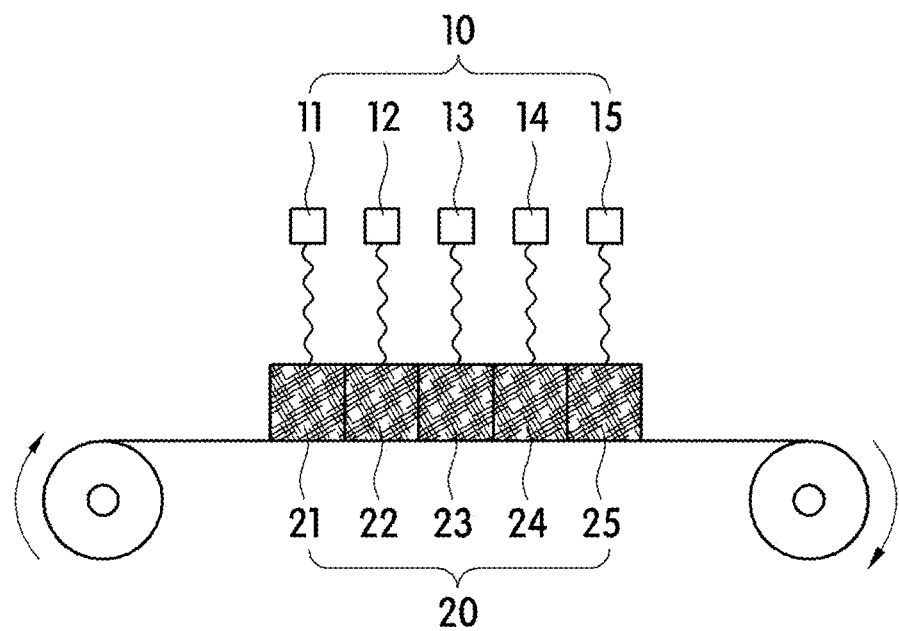
FIG. 1 is a schematic view of a process of manufacturing an ion exchange membrane according to one embodiment of the present invention.

Hereinafter, with reference to the accompanying drawings, embodiments of the present invention will be described in detail enough for those of ordinary skilled in the art to easily perform embodiments of the invention. The invention may, however, be embodied in many different forms and should not be construed as being limited to the embodiments set forth herein. In the following description of the present invention, a detailed description of known functions and configurations incorporated herein is omitted to avoid making the subject matter of the present invention unclear and, in every possible case, like reference numerals are used for referring to the same or similar elements in the description and drawings.

Referring to FIG. 1 showing a method for manufacturing an ion exchange membrane according to one embodiment of the present invention, a support fiber producing solution (not shown) is electrospun through the first electrospinning tip 11, the third electrospinning tip 13 and the fifth electrospinning tip 14 of a plurality of the electrospinning tips 10 to prepare support fiber mats 21, 23 and 25 in which support fibers are accumulated, and an ion exchange fiber producing solution (not shown) is electrospun through the second electrospinning tip 12 and the fourth electrospinning tips 15 to prepare ion exchange fiber mats 22 and 24 in which ion exchange fibers are accumulated so that a laminate, in which the support fiber mats and the ion exchange fiber mats are alternately stacked, may be prepared by alternately electrospinning such that fiber mats of different types are disposed to adjoin each other.

The support fiber producing solution included in the spinning solution includes a support fiber producing component, and may be a melt in which the producing component is melted or a dissolved solution in which the producing component is dissolved by a solvent. The support fiber producing solution may include the support fiber producing component at 5 to 30 wt %. When the support fiber producing component is included at less than 5 wt %, viscosity is lowered, and thus there may be a problem of fiber formation not being performed during electrospinning. When the support fiber producing component is included at more than 30 wt %, fibers may be melted or continuous fiber formation is limited during electro spinning.

Any compound may be used as the support fiber producing component without limitation as long as the compound is used as a component of a support in a conventional ion exchange membrane. Preferably, the support fiber producing component may be one or more selected from the group consisting of polyimides, polyamic acid, polycarprolactone, polyetherimide, nylon, polyaramid, polybenzyl-glutamate, polyphenyleneterephthalamide, polyaniline, polyacrylonitrile, polyethylene oxide, polystyrene, cellulose, polymethylmethacrylate, polylactic acid (PLA), polyglycolic acid (PGA), polylactic-co-glycolic acid, poly{poly(ethylene oxide)terephthalate-co-butylene terephthalate} (PEOT/PBT), polyphosphoester (PPE), polyphosphazene (PPA), polyanhydride (PA), poly(ortho ester) (POE), poly(propylene fumarate)-diacrylate (PPF-DA}, polyvinyl alcohol, polyester, polyurethane, polyvinyl chloride, polytetra fluoroethylene (PTFE), polyethylene tetrafluoro ethylene (ETFE), polyvinylidene fluoride (PVDF), ethylene chlorotrifluoroethylene (ECTFE), polychlorotrifluoro ethylene (PCTFE), and poly(styrene-co-maleic anhydride). However, the present invention is not limited thereto, and the component may be changed according to the purpose of the ion exchange membrane.

Further, the support fiber producing solution may be electrospun in a manner in which at least two types of the support fiber producing components are included in a spinning solution as the support fiber producing component, or at least two types of the support fiber producing components each may be included in different spinning solutions and cross-spun through different spinning nozzles.

When a mixture spinning solution is formed using two types of support fiber producing components as the support fiber producing component, for example, when polyvinylidene fluoride (PVDF) as an adhesive support fiber producing component (or a swelling support fiber producing component) is mixed with polyacrylonitrile (PAN) as a heat-resistant support fiber producing component, polyacrylonitrile (PAN) and polyvinylidene fluoride (PVDF) are preferably mixed at a ratio of 8:2 to 5:5 wt %.

When the mixed ratio of the heat-resistant support fiber producing component to the adhesive support fiber producing component is less than 5:5 by weight ratio, required high-temperature properties may not be achieved due to decreased heat resistance. When the mixed ratio is more than 8:2 by weight ratio, strength is lowered, and problems with spinning occur.

When the support fiber producing solution is a mixed solution of the heat-resistant support fiber producing component and the swelling support fiber producing component, a single solvent or a two-component-based mixed solvent in which a high-boiling-point solvent and a low-boiling-point solvent are mixed may be used. In this case, the mixed ratio of the two-component-based mixed solvent to the total support fiber producing component is preferably about 8:2 by weight ratio. In the present invention, when a single solvent is used, a process of adjusting the amount of solvent and moisture remaining on a surface of the support fiber mat to be described below while the support fiber mat passes through a pre-air dry zone caused by a preheater may be further performed after the spinning process, considering that the solvent may not be easily volatilized, according to the type of the support fiber producing component.

The heat-resistant support fiber producing component is a resin which may be dissolved in an organic solvent for electrospinning and has a melting point of 180° C. or more, and examples thereof include aromatic polyesters such as polyacrylonitrile (PAN), polyamide, polyimide, polyamide-imide, poly(meta-phenylene isophthalamide), polysulfone, polyether ketone, polyethylene terephthalate, polytrimethylene terephthalate, polyethylene naphthalate and the like, polyphosphazenes such as polytetrafluoroethylene, polydiphenoxaphospazene, poly{bis[2-(2-methoxyethoxy) phosphazene]}, polyurethane copolymers including polyurethanes and polyetherurethanes, cellulose acetate, cellulose acetate butyrate, cellulose acetate propionate, etc.

The swelling support fiber producing component is a resin causing swelling in an electrolyte, and may be formed as ultrafine fibers by electrospinning, and examples thereof include polyvinylidene fluoride (PVDF), poly(vinylidene fluoride-co-hexafluoropropylene), perfluoropolymers, polyvinyl chloride or polyvinylidene chloride and a copolymer thereof and polyethylene glycol derivatives including polyethylene glycol dialkyl ether and polyethylene glycol dialkyl ester, poly (oxymethylene-oligo-oxyethylene), polyoxides including polyethylene oxide and polypropylene oxide, polyvinyl acetate, poly(vinylpyrrolidone-vinyl acetate), polystyrene and a polystyrene acrylonitrile copolymer, a polyacrylonitrile copolymer including a polyacrylonitrile methyl methacrylate copolymer, polymethyl methacrylate, and a polymethyl methacrylate copolymer and mixtures thereof.

Any solvent may be used as the solvent without limitation as long as the solvent is used in the preparation of a conventional electrospinning solution, and in addition, any solvent which dissolves the support fiber producing component and may be easily vaporized may be used without limitation. Since the solvent may be selected according to the type of the support fiber producing component to be specifically selected, the present invention is not limited to a specific type. A single-component-based solvent such as dimethylformamide (DMF) may be used, but when a two-component-based solvent is used, it is preferable to use the two-component-based solvent in which a high-boiling-point component and a low-boiling-point component are mixed. Here, the two-component-based solvent, in which a high-boiling-point component and a low-boiling-point component are mixed at 7:3 to 9:1 by weight ratio, may be used, but the present invention is not limited thereto.

Next, the ion exchange fiber producing solution may include an ion exchange fiber producing component, and the producing component may be a melt or a dissolved solution dissolved by a solvent. The ion exchange fiber producing solution may include an ion exchange producing component at 5 to 60 wt %. When the ion exchange producing component is included at less than 5 wt %, viscosity is lowered, and thus there may be a problem in that fiber formation may not be smoothly performed during electrospinning. When the ion exchange producing component is included at more than 60 wt %, spun fibers may not be continuous, and breakage of fibers may frequently occur.

The ion exchange fiber producing component may be a cationic ion exchange fiber producing component or an anionic ion exchange fiber producing component, and a cation exchange membrane or anion exchange membrane may be implemented according to the selected polarity of the ion.

When a bipolar ion exchange membrane is to be implemented, the ion exchange fiber producing solution may include a first ion exchange fiber producing solution containing a cationic ion exchange fiber producing component and a second ion exchange fiber producing solution containing an anionic ion exchange fiber producing component, and each of the first ion exchange fiber producing solution and the second ion exchange fiber producing solution may be electrospun to form separate ion exchange fiber mats.

The cationic ion exchange fiber producing component may be a polymer compound having an anion exchangeable functional group such as quaternary ammonium salt (—$NH_3$), a primary to tertiary amine (—$NH_2$, —NHR and —$NR_2$), a quaternary phosphonium group (—$PR_4$), and a tertiary sulfonium group (—$SR_3$).

Further, the anionic ion exchange fiber producing component may be a polymer compound having a cationic exchangeable functional group such as a sulfonic acid group (—$SO_3H$), a carboxyl group (—COOH), a phosphonic group (—$PO_3H_2$), a phosphonic group (—$HPO_2H$), an asonic group (—$AsO_3H_2$), a selinonic group (—$SeO_3H$) and the like, and specifically, polysulfone, polyethersulfone, and the like may be used.

Further, the cationic or anionic ion exchange fiber producing component may be a polymer compound having a condensation polymerization type crosslinking reaction functional group including a hydroxyl group (—OH), an amine group (—$NH_2$, —NH—, —NR— and —$NR_2$), and a carboxylic acid group (—COOH) which may perform a crosslinking reaction by an ester bond, an epoxy group or an isocyanate functional group capable of forming a urethane bond as a crosslinking reaction functional group, or a polymer compound having a double bond structure capable of performing a crosslinking reaction by addition polymerization. Such a polymer resin may be dissolved in an organic solvent and present in the form of a solution, and specific examples thereof include polystyrene, polysulfone, polyisophthalone, polyamide, polyester, polyimide, polyether, polyethylene, polytetrafluoro ethylene, polyglycidyl methacrylate, or mixtures of two or more thereof.

When the ion exchange fiber producing solution is a dissolved solution, the producing solution further includes a solvent. Any solvent may be used as the solvent as long as the solvent is used in the preparation of a conventional electrospinning solution, and in addition, any solvent which dissolves the ion exchange producing component and may be easily vaporized may be used without limitation. Since the solvent may be selected according to the type of the ion exchange fiber producing component to be specifically selected, the present invention is not limited to a specific type. Preferably, one or more selected from the group consisting of γ-butyrolactone, cyclohexanone, 3-hexanone, 3-heptanone, 3-octanone, N-methylpyrrolidone, dimethylacetamide, dimethyl sulfoxide, acetic acid, toluene, formic acid, acetone, chloroform, dichloromethane, trichlorethylene, ethanol, methanol, normal hexane and dimethylformamide may be used.

The support fiber producing solution and the ion exchange fiber producing solution described as the spinning solution above may be put into a conventional electrospinning device. The electrospinning device may be a device for wet spinning or dry spinning according to the specific type of the spinning solution selected.

For example, the spinning solution may be fed into a supply unit of the electrospinning device and conveyed to a nozzle unit through a pump unit such as the widely-known syringe pump. The nozzle unit may include nozzles and a connection unit for connecting the nozzles to the supply unit. However, since the nozzle unit may be formed by connecting the nozzles to the supply unit without a connection unit, the specific configuration of the nozzle unit is not particularly limited in the present invention, and the configuration of the nozzle unit included in the conventional electrospinning device may be selected and changed.

The diameter of the nozzle of the nozzle unit may be selected in consideration of the desired basis weight, porosity, pore diameter, mechanical strength, or the like of the fiber mat, and is not particularly limited in the present invention. Further, the cross-sectional shape of the nozzle may be various shapes such as a circle, an ellipse, a polygon and the like, and the cross-sectional shape of the nozzle may be a cross-sectional shape of a conventional electrospinning nozzle such as a single nozzle, a double nozzle, a triple nozzle, etc. Further, the nozzle unit may include a plurality of nozzles according to the purpose, and the diameter of each of the plurality of nozzles may be different, and the specific shape, size, number, and the like of the nozzles are not limited in the present invention. Further, the material of the nozzle may be a material of a nozzle used for conventional electrospinning, and it may preferably be a metal material having electrical conductivity, but the present is not limited thereto.

A portion of the nozzle unit may be connected so as to be in electrical communication with an electric field forming unit such as a high voltage device to form an electric field for electro spinning. The electric field forming unit forms a jet of the spinning solution from the nozzle unit to the collector, and may adopt any configuration capable of forming an electric field between a nozzle tip of the nozzle unit and an imaginary point passing linearly through the nozzle tip and the collector without limitation. The configuration of the electric field forming unit provided in the conventional electrospinning device may be selected, and the electric field forming unit is not particularly limited in the present invention. However, the electric field forming unit may include a current collecting plate and a high voltage generating device, the current collecting plate may be grounded, and the high voltage generating unit may be electrically connected to the nozzle unit.

When wet electrospinning is performed, a collector may further include a coagulation bath. The coagulation bath may include an external coagulation solution for coagulating the jet of the spinning solution into a fibrous shape. As the external coagulating solution, water, an organic solvent, and the like may be used without limitation, and the specific type thereof is not particularly limited in the present invention. A non-limiting example thereof may be one or more selected from hexane, benzene, ethanol, methanol, propanol, acetone, butanol, dimethylformamide, tetrahydrofuran, and the like, but is not limited thereto.

Further, an air gap, which is a vertical distance between the nozzle tip of the nozzle unit and the surface of the external coagulating solution of the collector or coagulation bath, may be in the range of 0 to 50 cm, but is not limited thereto.

Figure 2:
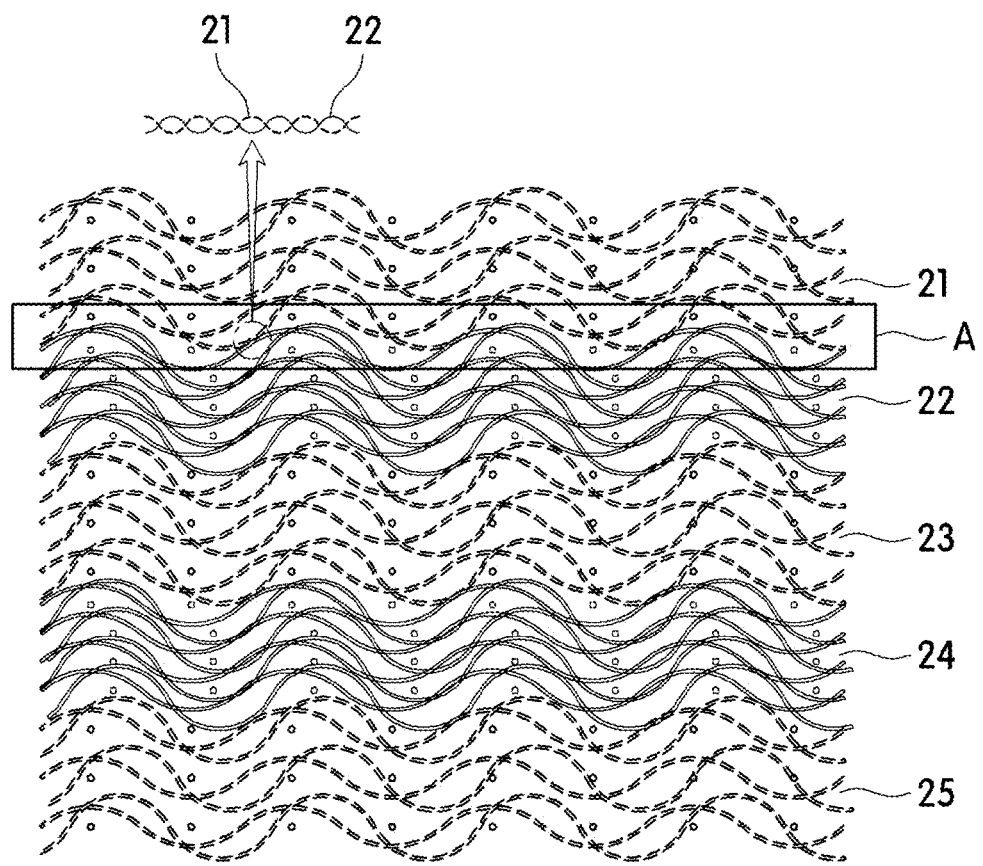
FIG. 2 is a cross-sectional view of an ion exchange membrane according to one embodiment of the present invention prepared by a process shown in FIG. 1.

The ion exchange membrane prepared by the above-described preparation method has a structure in which support fiber mats and ion exchange fiber mats are alternately stacked. As shown in FIG. 2, the first ion exchange fiber mat 22 and the second ion exchange fiber mat 24 are interposed between the first support fiber mat 21 on which the support fibers 21a and 21b are accumulated, the second support fiber mat 23, and the third support fiber mat 25, so that each fiber mat may alternately be stacked.

Figure 3:
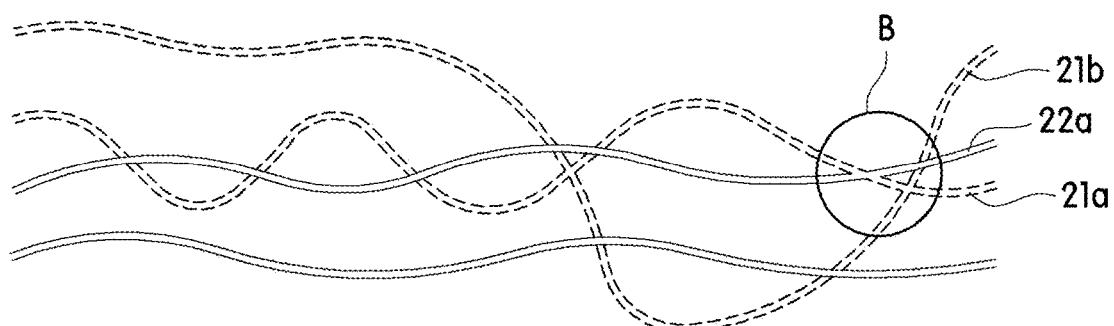
FIG. 3 is a partially enlarged schematic view of portion A of the ion exchange membrane according to FIG. 2.

Further, as shown in FIG. 3, in a surface portion A of the first support fiber mat 21 and the first ion exchange fiber mat 22, the support fibers 21a and the ion exchange fibers 22a are mixed and entangled so that the support fibers 21a and the ion exchange fibers 22a are bound physically. Accordingly, the first support fiber mat 21 and the first ion exchange fiber mat 22 may be bound without any separate adhesive component, without being separated from each other, so that peeling between the fiber mats may be minimized.

Figure 4:
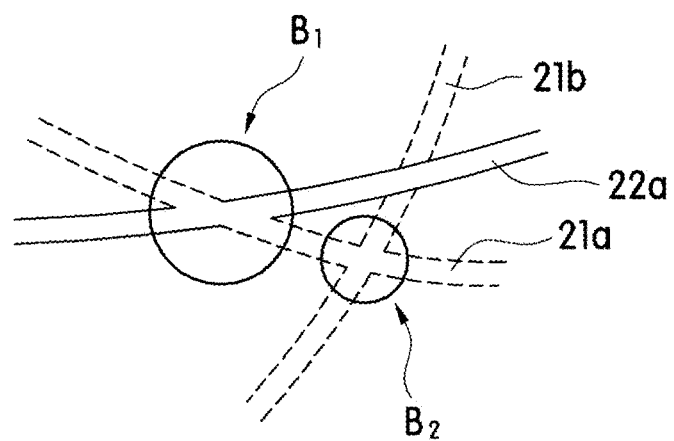
FIG. 4 is a partially enlarged view of Area B of FIG. 3.

Further, in the ion exchange membrane, one or more fiber mats of the support fiber mats 21, 23, and 25 and the ion exchange fiber mats 22 and 24 may include a region having a three-dimensional network structure formed by fusing fibers. Referring to FIG. 4, the surfaces of the first support fiber 21*a* and the first ion exchange fiber 22*a* are partially fused ($B_1$), and the surfaces of the first support fiber 21*a* and the second ion exchange fiber 21*b* are partially fused ($B_2$) to form a web with a three-dimensional network structure. The fusion does not refer to only the partial melting of the fibers through a separate heating process. Specifically, during the electrospinning process, the solvent contained in the spinning solution is usually spun irrespective of the electrospinning method and then vaporized in the air. In the case of wet electrospinning, remaining solvent which has not been vaporized may be dissolved in the external coagulating solution and removed, and solvent which has not been completely vaporized and/or dissolved but is present in the spun fibers may induce attachment at contact points or contact surfaces when contact occurs between the fibers.

The fusion may occur not only at the surface portion between two mats different from each other as shown in FIG. 4, but also between the support fibers included in each of the fiber mats or between the ion exchange fibers, and accordingly, each fiber mat may include a region having a three-dimensional network structure. When the web having the three-dimensional network structure is contained in a single fiber mat, a stable pore structure may be formed between the fibers and mechanical strength of the single fiber mat may be improved, and when the web is formed at the surface portions of adjoining fiber mats different from each other, it is possible to exhibit a binding force higher than the binding force exhibited between the mats by entanglement of the fibers described above, and thus the web is very advantageous for improving the mechanical strength of the ion exchange membrane. Further, a fatal problem accompanied by deterioration of physical properties such as a decrease in ion exchange capacity or a decrease in filtration efficiency caused by separation between the adjoining fiber mats different from each other may be prevented.

Further, an average diameter of the support fiber included in the support fiber mats 21, 23 and 25 may be in the range of 0.1 to 100 μm. When the diameter of the support fiber is less than 0.1 μm, the mechanical strength is weakened and their function as the support fiber may not be properly performed, and the spinnability may be lowered. Further, when the diameter is more than 100 μm, the support fiber is not easily melted when the support fiber is melted by applying heat and pressure according to the purpose of the ion exchange membrane prepared through Step (1) as described above, and accordingly, the adjustment of the pore diameter of the support fiber mat may not be easy. However, the diameter is not limited to the above-described diameter range of the support fibers, and the fiber diameter range may be changed according to the purpose of the ion exchange membrane.

An average pore diameter of a single support fiber mat of the support fiber mats 21, 23 and 25 may be in the range of 0.1 to 10 μm. When the average pore diameter is less than 0.1 μm, there may be a problem in that flux is significantly reduced during use in a filter. Further, when the average pore diameter is more than 10 μm, filtration efficiency may be lowered during use in a filter. However, the average pore diameter is not limited to the above-described average pore diameter range, and may be changed according to the purpose of the ion exchange.

Further, the thickness of the single support fiber mat in the support fiber mats 21, 23 and 25 is preferably in the range of 0.1 to 200 μm. When the thickness is less than 0.1 μm, the mechanical properties may be significantly reduced. When the thickness is more than 200 μm, there may be a problem in that manufacturing costs increase, and the volume of the ion exchange membrane becomes large so that the amount of the ion exchange membrane provided in the limited space is reduced.

Further, the pore diameter and thickness of the support fiber mats 21, 23, and 25 may be adjusted according to the desired purpose of the ion exchange membrane through Step (2) which will be described below, and heat applied at a temperature above a melting point of the support fiber may partially or completely melt the support fiber so that the support fiber may flow into pores of the ion exchange fiber mat, thereby affecting control of the pore diameter and porosity of the ion exchange fiber. In addition, the support fiber mat may be coated or filled with an inorganic material according to the purpose, and the inorganic material may include one or metals of nickel (Ni), copper (Cu), stainless steel (SUS), titanium (Ti), chromium (Cr), manganese (Mn), iron (Fe), cobalt (Co), zinc (Zn), molybdenum (Mo), tungsten (W), silver (Ag), gold (Au), and aluminum (Al) or oxides thereof, etc.

Further, an average diameter of the ion exchange fiber of the ion exchange fiber mats 22 and 24 may be in the range of 100 to 2000 nm. Further, an average pore diameter of a single ion exchange fiber mat in the ion exchange fiber mats 22 and 24 may be in the range of 0.1 to 1 μm. Further, a thickness of the single ion exchange fiber mat may be in the range of 0.1 to 10 μm. However, the average diameter, the average pore diameter and the thickness range of the ion exchange fiber may be changed according to the purpose of the ion exchange membrane, and the present invention is not limited thereto.

Further, the weight ratio between the support fibers and the ion exchange fibers contained in all of the support fiber mats 21, 23 and 25 and the ion exchange fiber mats 22 and 24 may be 1:0.8 to 1.5. When the ion exchange fiber is included at less than 1:0.8 by weight ratio with respect to the support fiber, it is difficult to achieve the desired physical properties. For example, exhibition of the ion exchange capacity may be insignificant. Further, when the ion exchange fiber is included at more than 1:1.5 by weight ratio with respect to the support fiber, it is difficult to attain desired physical properties. For example, mechanical strength is lowered. However, even when the weight ratio of the support fibers and the ion exchange fibers contained in the ion exchange membrane is satisfied, the thickness ratio of the single support fiber mat and the single ion exchange fiber mat may be 1:0.2 to 1:0.8 for improved mechanical strength and ion exchange capacity. When the thickness of the single ion exchange fiber mat decreases such that the thickness ratio of the single support fiber mat and the single ion exchange fiber mat is less than 1:0.2, the improvement of exhibition of the ion exchange capacity may be insignificant. Further, when the thickness of the single ion exchange fiber mat increases such that the thickness ratio of the single support fiber mat and the single ion exchange fiber mat is more than 1:0.8, the mechanical strength may be lowered or the degree of improvement of the mechanical strength may be insignificant, and chemical stability is deteriorated such that the ion exchange membrane may be damaged in a strong oxidation or reduction environment, and thus the ion exchange capacity may be lowered.

Further, Step (2), which is included according to purpose in the preferred embodiment of the present invention and is a step of applying heat and pressure to the stack in which the support fiber mats and the ion exchange fiber mats are alternately stacked so that at least a portion of the support fibers contained in the support fiber mat are melted and at least a portion of the melted support fiber permeates into pores of the ion exchange fiber mat, may be further included.

To this end, according to one embodiment of the present invention, the melting point of the material of the support fibers included in the support fiber mat may be lower than the melting point of the material of the ion exchange fibers included in the ion exchange fiber mat, and the support fibers included in the support fiber mat may be partially melted by heat and pressure applied through Step (2).

Accordingly, in the ion exchange membrane according to one embodiment of the present invention, the support fiber mats and ion exchange fiber mats are alternately stacked, and at least a portion of a surface of one ion exchange fiber of ion exchange fibers provided in the ion exchange fiber mat includes a fused part in which the support fiber provided on the support fiber mat disposed to adjoin the surface of the ion exchange fiber mat has been melted and fused. Further, as shown in FIG. 5, a surface of the first ion exchange fiber 22a in the first ion exchange fiber mat 22 may include a fused part in which the support fibers 21e forming the first support fiber mat 21 have been melted and fused.

Figure 5:
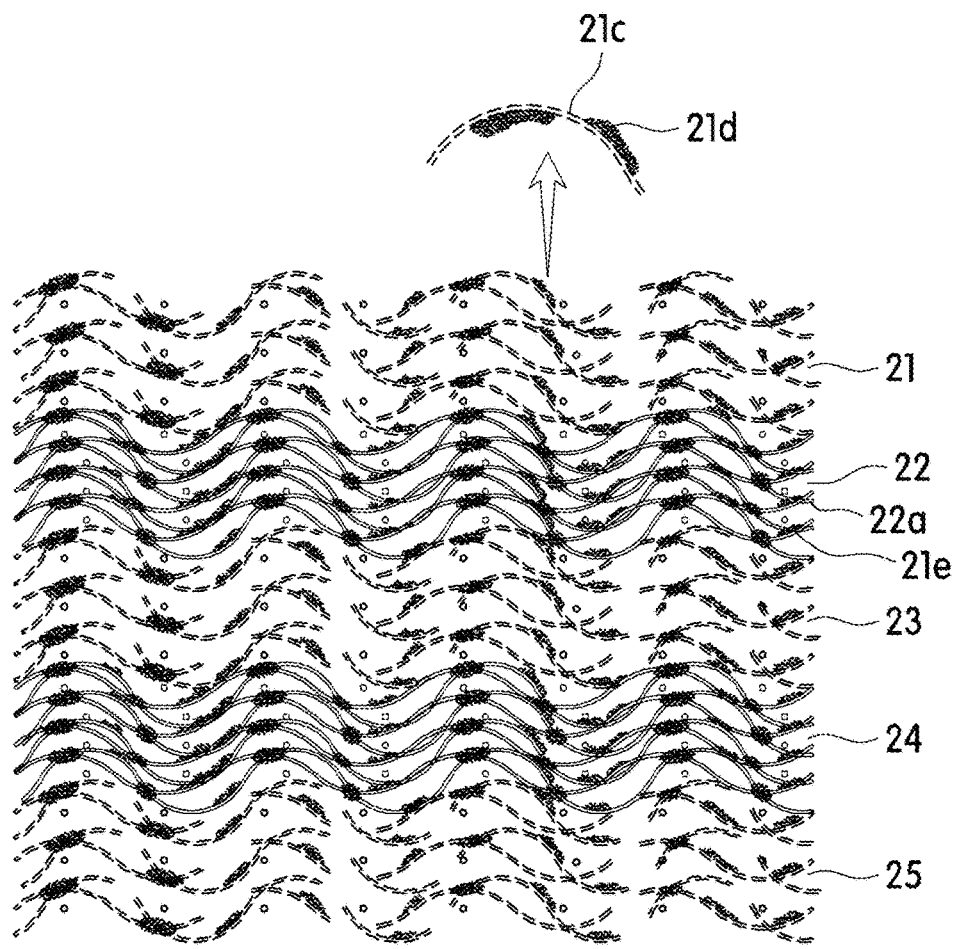
FIG. 5 is a cross-sectional view of an ion exchange membrane according to one embodiment of the present invention.

Further, melting and fusion of the support fibers does not occur only on the surface portion of the ion exchange fiber mat, but occurs even in a single support fiber mat, and as shown in FIG. 5, a surface of the first ion exchange fiber 21c in the first support fiber mat 21 may include a fused part 21d in which another support fiber has been melted and fused.

In the ion exchange membrane as described above, since the melting point of the ion exchange fiber is lower than the melting point of the support fiber, the support fiber is partially melted by heat and pressure or the melted support fiber fills the space between fibers or is fused to the fiber surface, the support fiber mats and the ion exchange fiber mats are compressed, and accordingly, the pore diameter, porosity, or the like of the mats are controlled, and the melted support fibers more firmly bond and support the ion exchange fibers, so that the ion exchange membrane exhibits superior ion exchange capacity and significantly improved mechanical strength as compared to a conventional ion exchange membrane, particularly to an ion exchange membrane prepared by filling using a supporter in the form of a fiber web with ion exchangeable components.

Moreover, the ion exchange membrane having further improved pore diameter and porosity may be more suitable for physical properties required for use in capacitive deionization (CDI), electrodialysis, (ED) or battery separators in addition to the liquid filters and air filters described above.

Further, when the ion exchange membrane is used for a liquid filter or an air filter, Step (2) may be omitted, or heat and/or pressure applied may be low and/or the duration of Step (2) may be short even when Step (2) is performed. Further, even in the case in which the ion exchange membrane is used for the same filter, the specific heat, pressure, and execution duration may vary according to the size of the target material to be filtered.

Further, as the ion exchange membrane according to one preferred embodiment of the present invention, the ion exchange membrane may be implemented so that the heat applied in Step (2) is higher than the melting point of the support fibers to melt the support fibers, and the melted support fibers fill the ion exchange fiber mat and solidify.

Figure 6:
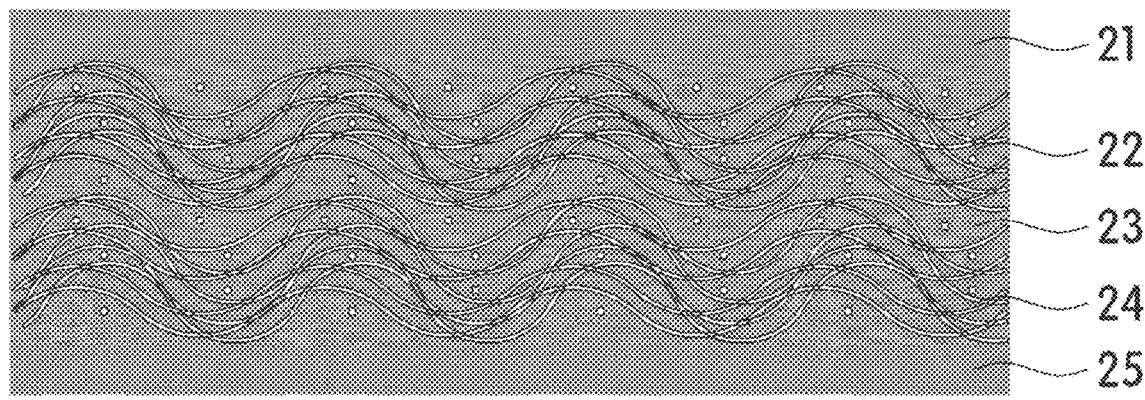
FIG. 6 is a cross-sectional view of an ion exchange membrane according to one embodiment of the present invention.

Referring to FIG. 6, in the case of the first ion exchange fiber mat 22 and the second ion exchange fiber mat 24, the ion exchange fibers form a mat in the form of fibers as the ion exchange fibers are spun, but in the case of the first support fiber mat 21 or the third support fiber mat 25, the support component in the form of fibers for forming a mat is melted without forming a mat in the form of a fiber assembly, may fill spaces of fibers of the first ion exchange fiber mat 22 and the second ion exchange fiber mat 24, and may be solidified into a film. Further, the first support fiber mat 21 or the third support fiber mat 25 shown in the drawing only represents a region where the support fiber mat which used to be in the form of a fiber was positioned, and does not represent that the ion exchange membrane according to FIG. 6 still contains the support fiber mat in the form of fibers.

Since spaces between fibers of the first ion exchange fiber mat 22 and the second ion exchange fiber mat 24 are filled with the support fiber, the ion exchange membrane according to FIG. 6 may have a porosity of 5% or less, preferably 3% or less, and more preferably 1% or less, and still more preferably may have a porosity of 0%. The ion exchange membrane having a significantly low porosity or no pores as described above may be very suitable as a battery separator due to satisfying the mechanical properties and electrical properties required by a battery separator of a fuel cell, a redox flow battery, or the like.

Next, the ion exchange membrane according to a second embodiment of the present invention and a preparation method thereof will be described. However, description of contents the same as that described in the preparation method according to the first embodiment is omitted.

The ion exchange membrane according to the second embodiment of the present invention may be implemented by a method including (I) preparing a fiber mat by electro spinning a spinning solution containing a support component and an ion exchangeable component. The main difference between the first embodiment and the second embodiment is that the ion exchange membrane according to the second embodiment is prepared by a method in which the support fiber producing component forming the support fiber and the ion exchange fiber producing component forming the ion exchange fiber are mixed in a single spinning solution and spun, in contrast to the first embodiment.

Specifically, when the electrospinning device of FIG. 1 is used, a spinning solution in which the support component and the ion exchangeable component are mixed is electrospun by a plurality of the electrospinning tips 10 so that fiber mats 21 to 25 formed by accumulating fibers may be prepared.

The spinning solution includes the support component and ion exchangeable component, and the spinning solution may be a melt in which the support component and the ion exchangeable component are mixed and melted, or a dissolved solution in which the components are dissolved by a solvent. Here, the spinning solution may include the ion exchangeable component at 20 to 80 parts by weight, and preferably 30 to 60 parts by weight with respect to 100 parts by weight of the support component. When the ion exchangeable component is included at less than 20 parts by weight, the ion exchange capacity may be significantly lowered, and when the ion exchangeable component is included at more than 80 parts by weight, spinnability is significantly reduced such that the spinning solution is spun into beads, and there may be a problem of a decrease in mechanical strength.

The spinning solution may further include a solvent. The description of the support component, the ion exchangeable component, and the solvent included in the spinning solution of the second embodiment are the same as the description of the support fiber producing component, the ion exchange fiber producing component, and the solvent of the first embodiment.

The spinning solution may be implemented as an ion exchange membrane through electrospinning, and the description of the electrospinning device and the method thereof used at this time is that of the first embodiment.

The ion exchange membrane according to the second embodiment prepared by electrospinning a single spinning solution includes a first fiber including a support component and an ion exchangeable component.

Figure 7:
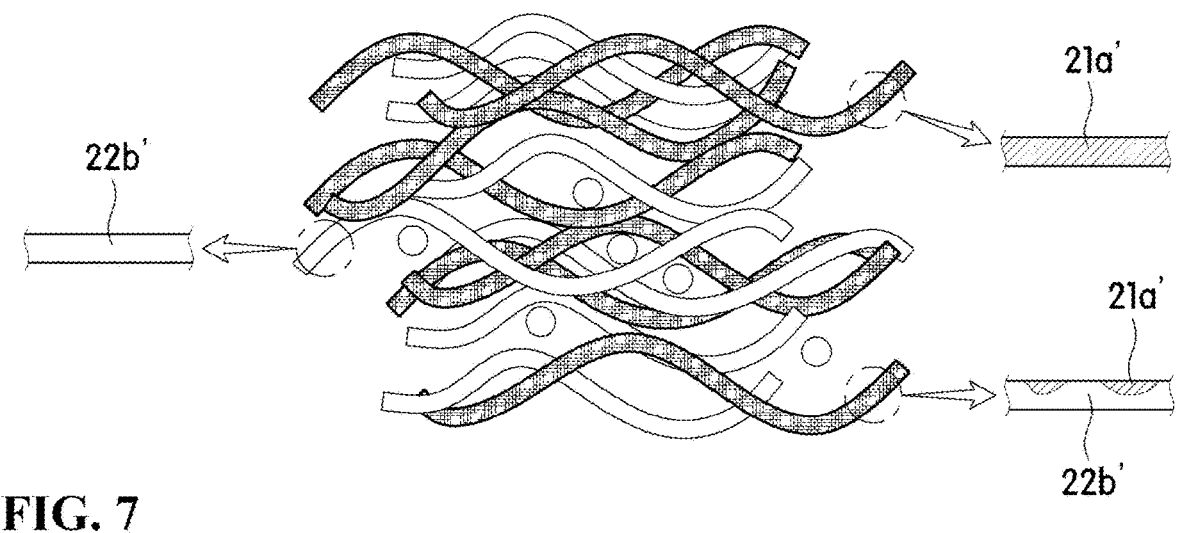
FIG. 7 is a cross-sectional view of an ion exchange membrane according to one embodiment of the present invention.

One strand of the fiber forming the fiber mat may be spun in a state containing both the support component and the ion exchangeable component, but each component in some fibers contained in the fiber mat is separated during a spinning process due to the phase separation between the components, so that each component may form one strand of the fiber, and thus the fiber mat may further include one or more of a second fiber including a support component and a third fiber including an ion exchangeable component, and the ion exchange membrane may include all of the first fibers 21$a$' and 22$b$', the second fiber 21$a$', and the third fiber 22$b$' as shown in FIG. 7.

Further, the fiber mat may include a web region having a three-dimensional network structure formed by fusing fibers, which is described in the above description of FIG. 4.

Further, after Step (I), the method for manufacturing the fiber mat may further include (II) applying at least one of heat and pressure to the fiber mat to control a porosity and a pore diameter. Thus, the pore diameter and thickness may be controlled according to the desired purpose of the ion exchange membrane, the heat applied at a temperature above the melting point of the support component may control the pore size and porosity of the fiber mat prepared by partially or completely melting a mono yarn, which includes a support component and is part of the fibers, and partially or completely filling pores. For example, fibers in the fiber mat may be fused and bonded to each other and/or the pores in the fiber mat and may be filled with the melted support component. The temperature of the applied heat may be in the range of 60 to 180° C., and the pressure may be 2 psi or less, but the temperature and pressure are not limited thereto and may vary according to the purpose of the ion exchange membrane and the specific type of the support component and the ion exchangeable component.

Further, the average diameter of the fibers 21$a$', 21$a$'/22$b$', 22$b$' included in the fiber mat may be in the range of 0.1 to 100 μm. When the fiber diameter is less than 0.1 μm, mechanical strength is low such that it is difficult to form a stable pore structure, and thus the fiber mat may be unsuitable for use in a filter, and spinnability may be lowered. Further, when the diameter is more than 100 μm, it is not easy to melt the support component when the support component in the fiber is melted by separately applying heat/pressure, which will be described below according to purpose, and thus the pore diameter and porosity of the fiber mat may not be easily controlled. However, the diameter is not limited to the above-described fiber diameter range, and the fiber diameter range may be changed according to the purpose of the ion exchange membrane.

The average pore diameter of the fiber mat may be in the range of 0.1 to 10 μm. When the average pore diameter is less than 0.1 μm, flux may be significantly reduced during use in a filter. When the average pore diameter is more than 10 μm, filtration efficiency may be lowered during use in a filter. However, the average pore diameter is not limited to the above-described average pore diameter, and may be changed according to the purpose of the ion exchange membrane.

Further, the thickness of the fiber mat may be in the range of 0.1 to 200 μm, but is not limited thereto, and the thickness may be changed according to purpose.

Further, when the ion exchange membrane is used for a liquid filter or an air filter, a step of separately applying heat and pressure may be omitted, or low heat and/or pressure may be applied and/or the duration of the step may be short even when the step is performed. Further, even in the case in which the ion exchange membrane is used for the same filter, the specific heat, pressure, and execution duration may vary according to the size of the target material to be filtered.

Further, even when the above-described step of separately applying heat and pressure is not performed, it is possible to implement a fiber mat 20 in which mats 21 to 25 having different porosity, pore diameter, and the like may be stacked by controlling the diameter and/or spinning amount per hour of each of a plurality of the nozzles 11 to 15 in the preparation process as shown in FIG. 1, and accordingly, an ion exchange membrane having a gradient of pore diameter and/or porosity from one surface portion to another surface portion of the fiber mat may be implemented.

In the ion exchange membrane according to another preferred embodiment of the present invention, the melting point of the material of the support fibers included in the support fiber mat may be lower than the melting point of the material of the ion exchange fiber included in the ion exchange fiber mat, and the heat and pressure applied through Step (II) melts at least a part of the support component, and accordingly, fibers in the fiber mat may be fused and bonded to each other and/or the pores in the fiber mat may be filled with the melted support component.

Accordingly, the ion exchange membrane according to one embodiment of the present invention is implemented to include a fiber mat including fibers containing an ion exchangeable component and a supporter for supporting fibers by filling spaces between the fibers in the fiber mat.

The fiber forming the fiber mat may contain the ion exchangeable component as a main component of the fiber producing component because the support component is melted by heat and pressure, and some fibers may contain an unmelted support component. The supporter is formed by melting the support component contained in the first fiber or the support fiber contained in the second fiber among fibers included in the fiber mat prepared through Step (I), the porosity and pore diameter may be controlled by filling spaces between fibers in the fiber mat, and bonding strength between the fibers containing the ion exchangeable component as a main component is increased so that mechanical strength can be further improved.

The ion exchange membrane prepared through the second embodiment of the present invention includes a fiber mat formed by accumulating at least one fiber including the ion exchangeable component, and a supporter for supporting fibers by filling spaces between the fibers in the fiber mat.

The fiber forming the fiber mat may contain the ion exchangeable component as a main component of the fiber producing component because the support component is melted by heat and pressure, and some fibers may contain an unmelted support component. The support is formed by melting the support component contained in the first fiber or the support fiber contained in the second fiber among fibers included in the fiber mat prepared by the preparation method according to the second embodiment of the present invention, the porosity and pore diameter may be controlled by filling spaces between fibers in the fiber mat, and bonding strength between the fibers containing the ion exchangeable component as a main component is increased so that mechanical strength can be further improved.

Further, the ion exchange membrane with controlled porosity may be implemented to be suitable for use in capacitive deionization (CDI) or electrodialysis (ED).

Further, the ion exchange membrane having a porosity of 5% or less, preferably 3% or less, more preferably 1% or less, and still more preferably a nonporous ion exchange membrane having a porosity of 0% may be very suitable as a battery separator due to satisfying the mechanical properties and electrical properties required by a battery separator of a fuel cell, a redox flow battery, or the like.

Next, an ion exchange membrane according to a third embodiment of the present invention and a preparation method thereof will be described. However, the description of contents the same as those described in the preparation method according to the first embodiment or the second embodiment is omitted.

The ion exchange membrane according to the third embodiment of the present invention is prepared by a method including (A) electrospinning a first support fiber producing solution to form a first support fiber mat; (B) spraying an ion exchange solution onto the first support fiber mat to fill the support fiber mat with the ion exchange solution; and (C) electrospinning a second support fiber producing solution on the first support fiber mat on which the ion exchange solution is sprayed to form a second support fiber mat. Further, the method may further include (D) spraying an ion exchange solution onto the second support fiber mat to fill the support fiber mat with the ion exchange solution after Step (C).

Figure 8:
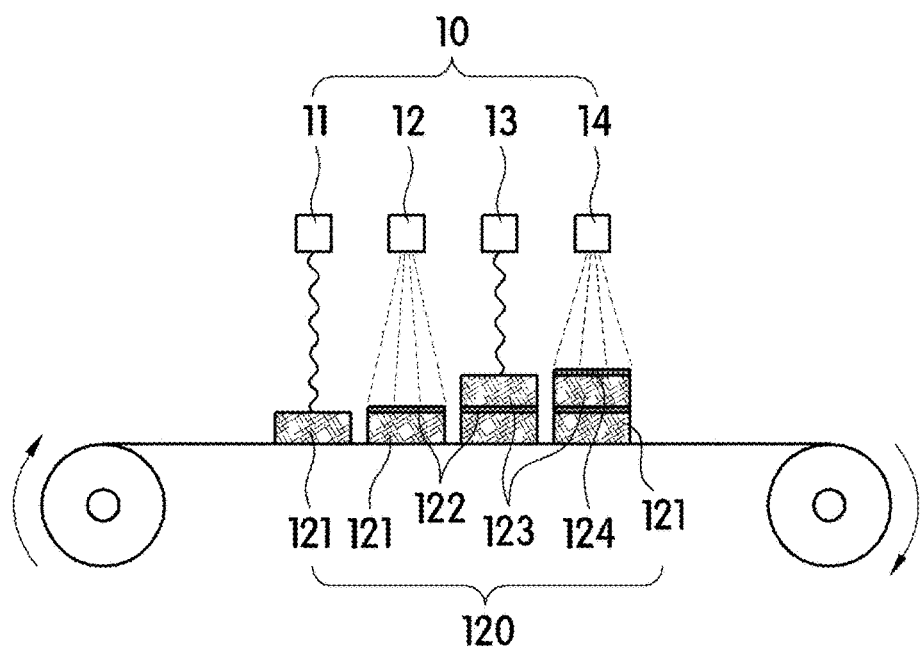
FIG. 8 is a schematic view of a process of manufacturing an ion exchange membrane according to one embodiment of the present invention.

Referring to FIG. 8, in the method for manufacturing an ion exchange membrane according to the third embodiment of the present invention, a support fiber producing solution (not shown) may be electrospun by the first and third electrospinning tips 11 and 13 of a plurality of the electrospinning tips 10 to prepare support fiber mats 121 and 123 in which support fibers are accumulated, and the ion exchange solutions 122 and 124 may be electrospun through the second and fourth electrospinning tips 12 and 15 so that the ion exchange solutions may fill in the support fiber mats 121 and 123.

More specifically, when the first support fiber producing solution is electrospun through the first electrospinning tip 11, the first support fiber mat 121 can be prepared, and the first support fiber mat 121 thus prepared is moved to a position at which the second electrospinning tip 12 is located by a conveyor belt, and then the ion exchange solution may be electrospun onto the upper portion of the first support fiber mat 121 by the second electrospinning tip 12. Here, since the ion exchange solution is controlled so as not to form fibers even when it is electrospun, the ion exchange solution that has been spun flows into spaces between fibers in the first support fiber mat to fill the spaces. The first support fiber mat 121 filled with the ion exchange solution 122 is moved to the position at which the third electrospinning tip 13 is located, and then the second support fiber producing solution may be electrospun by the third electrospinning tip 13 so that the second support fiber mat 123 is formed on the first support fiber mat 121 (and/or on the ion exchange solution 122). Thereafter, the stacked support fiber mats 121 and 123 are moved to the position where the fourth electrospinning tip 14 is located so that spaces between fibers in the second support fiber mat 124 may be filled with the electrospun ion exchange solution.

Further, FIG. 8 shows a preparation process of two repeated sets in a case in which spinning and spraying of one support fiber mat and the ion exchange solution are defined as one set, but the present invention is not limited thereto, and the above-described set may be repeated many times. Moreover, the ion exchange solution may not be sprayed on the top of the support fiber mat of the uppermost layer.

When the ion exchange membrane is prepared by the process as shown in FIG. 8 described above, the support is implemented as an electrospun support fiber mat, and thus the pore diameter and porosity of the support fiber mat may be very easily controlled according to the fineness and the spinning amount of the support fiber and the like, so that it is more advantageous for control of the desired physical properties. Further, in implementing the desired support, the support is implemented so that the support fiber mats are not formed by spinning the solution all at once and the support fiber mats are stacked on top of each other. Further, since the support fiber mats are filled with the ion exchange solution in the intermediate process in which the support fiber mats are stacked on top of each other, there is an advantage in that the filling property of the ion exchange solution may be significantly improved, compared with a case in which the ion exchange solution is used to fill after completely spinning the support fiber mats all at once.

First, as Step (A) according to the present invention, a step of electrospinning the first support fiber producing solution to form the first supporting fiber mat is performed. A detailed description of the first support fiber is the same as the description of the support fiber producing solution in the first embodiment described above, so a detailed description thereof is omitted.

Next, as Step (B) according to the present invention, a step of spraying the ion exchange solution onto the first support fiber mat so that the ion exchange solution fills in the prepared first support fiber mat is performed.

The ion exchange solution includes the ion exchangeable component, and the ion exchangeable component may be a melt or a dissolved solution in which the ion exchangeable component is dissolved by a solvent. When the ion exchange solution is a dissolved solution, the ion exchange solution may include an ion exchangeable component at 0.1 to 99 wt %.

Further, the ion exchangeable component may be a cationic ion exchangeable component or an anionic ion exchangeable component, and a cation exchange membrane or anion exchange membrane may be implemented according to the selected polarity of the ion. The descriptions of the type of the ion exchangeable component, the solvent in a case in which the ion exchange solution is a dissolved solution, and the like are the same as those described in the first embodiment, and thus are omitted.

Further, the ion exchange solution 122 described above is sprayed so as to fill the inside of the first support fiber mat 121.

The spraying may be performed by a conventional method in which it is possible to spray the ion exchange solution in a droplet state or a stream state, and for example, a method of electrospinning, electric spraying, ultrasonic spraying, and the like may be used without any limitation. When the electrospinning method is used, the ion exchange solution may be spun after adjusting the composition and composition ratio of the solution, or adjusting the spinning condition so as to prevent fiber formability.

Figure 9:
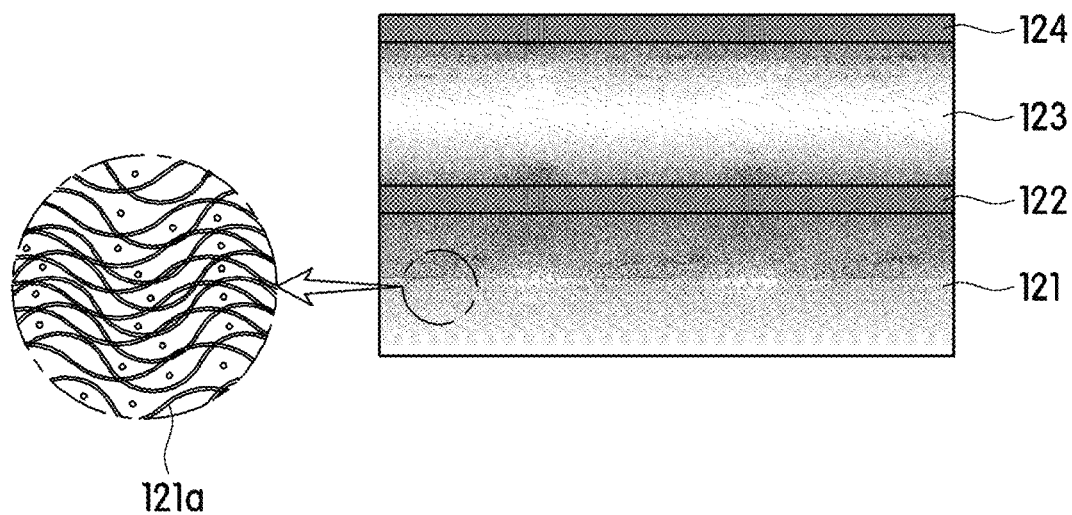
FIG. 9 is a cross-sectional view of an ion exchange membrane according to one embodiment of the present invention prepared by a process shown in FIG. 8.

The ion exchange solution 122 sprayed on the first support fiber mat 121 may flow into spaces between fibers of the first support fiber mat to fill in the support fiber mat. When the ion exchange solution is sprayed so that the support fiber mat is overfilled with the ion exchange solution, the ion exchange solution may form a separate layer on the first support fiber mat 121. Referring to FIG. 9, the first support fiber mat 121 is filled with the ion exchange solution 122, and the ion exchange solution 122 which overflows may form a separate layer 122 on the first a support fiber mat 121.

Next, as Step (C) according to the present invention, a step of electrospinning the second support fiber producing solution on the first support fiber mat 121 on which the ion exchange solution 122 is sprayed to form the second support fiber mat 123 is performed.

The description of electrospinning in Step (C) is the same as in Step (A) as described above, and thus is omitted.

Further, in Step (C), the description of the second support fiber producing solution is the same as the description of the support fiber producing solution described in the first embodiment, and is omitted. The second support fiber producing solution may be the same as the first support fiber producing solution or may have a different fiber producing component, and may be designed differently according to purpose such that the contents may be different even when the fiber producing components are the same.

Next, as Step (D), a step of spraying the ion exchange solution onto the prepared second support fiber mat so that the ion exchange solution fills in the support fiber mat may be further performed after Step (C). Here, the ion exchange solution may be the same as the ion exchange solution in Step (B) described above. However, the ion exchange solutions necessarily have the same charge. For example, when the ion exchange solution in Step (B) includes a cation exchangeable component, the ion exchange solution in Step (D) should also include a cation exchangeable component, and it is unnecessary that the component and/or content of the ion exchangeable component be the same.

Further, when the ion exchange solution is sprayed to the extent that ion exchange solution remains after filling the second support fiber mat 123, the ion exchange solution may form separate ion exchange layer 124 on the second support fiber mat 123.

According to one preferred embodiment of the present invention, as Step (E), which is the last step after Step (C) or (D), a step of applying at least one of heat and pressure to compress the first support fiber mat and the second support fiber mat and allowing the ion exchange solution to permeate the remaining voids in the support fiber mat may be further performed.

Step (E) is a step for controlling the degree of porosity, pore diameter, ion exchange capacity, and electrical properties of the stacked support fiber mat. The heat applied to the stacked support fiber mat may be at a temperature of 60 to 180° C. and the pressure may be 2 psi or less, but the temperature and pressure are not limited thereto and may vary according to the purpose of the ion exchange membrane and the specific type of the support component and the ion exchangeable component. For example, when the ion exchange membrane is used for a liquid filter or an air filter, Step (E) may be omitted, or low heat and/or pressure may be applied and/or the duration of Step (E) may be short even when Step (E) is performed. Further, even in the case in which the ion exchange membrane is used for the above filter, the specific heat, pressure, and execution duration may vary according to the size of the target material to be filtered. Furthermore, when the ion exchange membrane is used as a battery separator, since lower porosity increases the satisfactoriness of the required physical properties, heat and pressure may be applied so that there are almost no pores, and more preferably, so that there are no pore.

Further, Step (E) is not necessarily performed in order to form a nonporous support fiber mat, and even when pores of the support fiber mat are all filled with the ion exchange solution through Steps (B) and (D) described above, pores of the ion exchange membrane may not be present.

Figure 10:
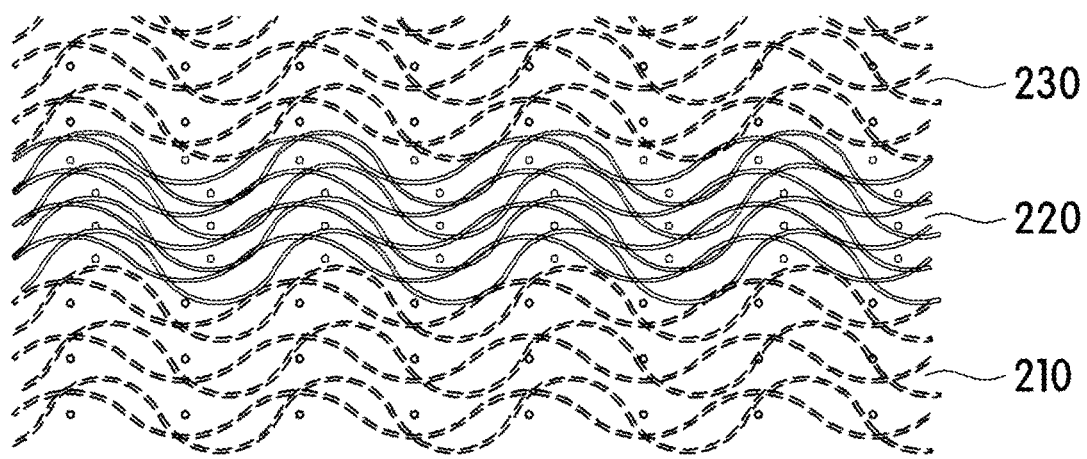
FIG. 10 is a cross-sectional view of an ion exchange membrane according to one embodiment of the present invention.

As shown in FIG. 10, in the ion exchange membrane according to the third embodiment of the present invention prepared by the above-described method, a plurality of support fiber mats including the first support fiber mat 210, the second support fiber mat 220 and the third support fiber mat 230 are sequentially stacked, and spaces between the fibers of the support fiber mats 210, 220 and 230 may be filled with the ion exchangeable component (not shown).

Figure 11:
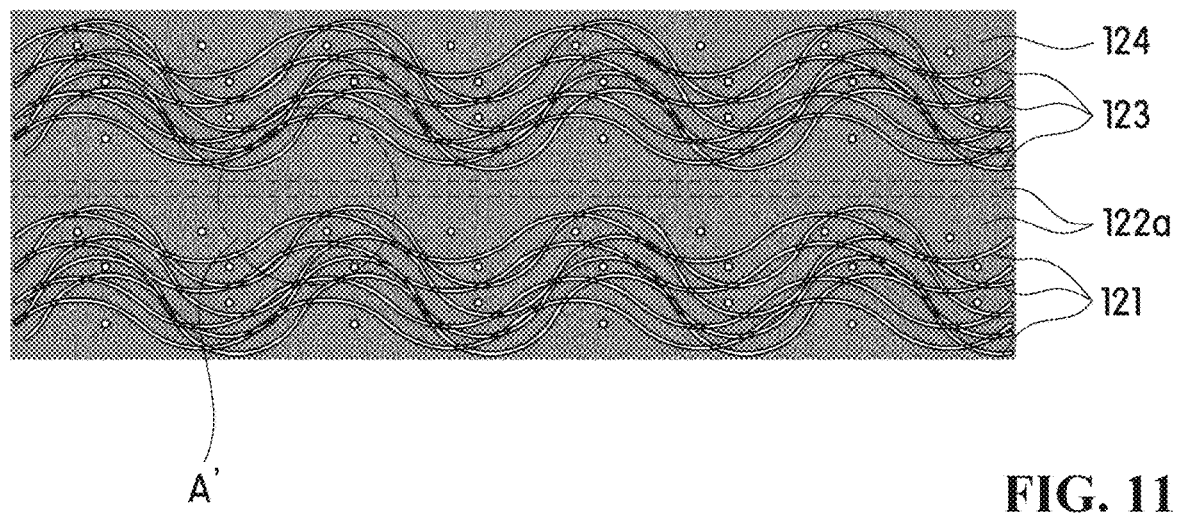
FIG. 11 is a cross-sectional view of an ion exchange membrane according to one embodiment of the present invention.

Further, as shown in FIG. 11, the first support fiber mat 121 and the second support fiber mat 123 are stacked, and the ion exchangeable component 122a fills in the space between the fibers of the first support fiber mat 121, and the ion exchangeable component 124 fills in the space between the fibers of the second support fiber mat 123, and a component same as the ion exchangeable component 122a which fills in the first support fiber mat 121 may form a separate ion exchange layer 122a between the first support fiber mat 121 and the second support fiber mat 123.

Figure 12:
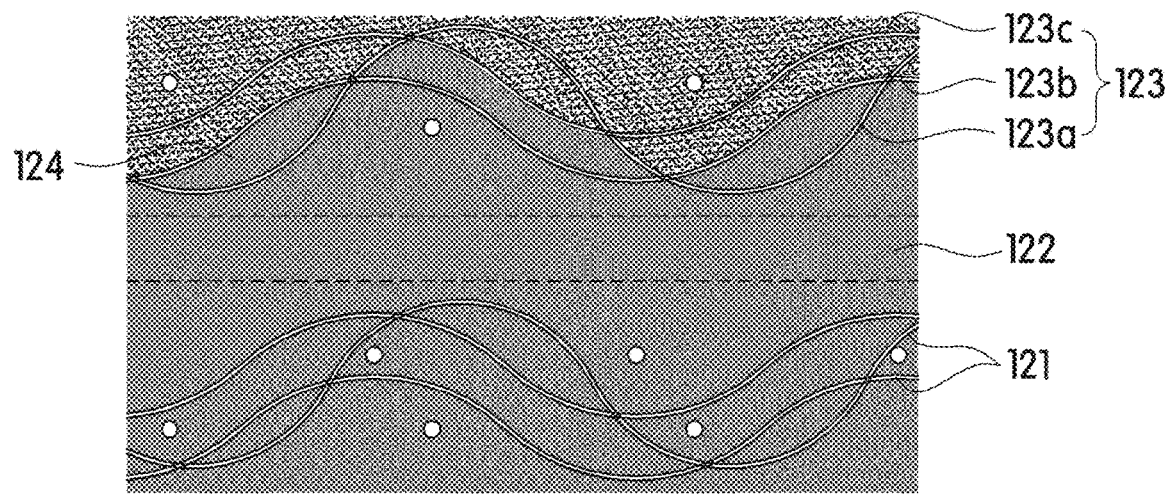
FIG. 12 is a partially enlarged view of portion A' of FIG. 11.

The ion exchange layer 122a may be formed by the first ion exchangeable component 122a which overflows from the first support fiber mat 121. Since FIG. 12 is a schematic view, the boundary between the first support fiber mat 121 and the second support fiber mat 122 is expressed by a dotted line, but the actual ion exchange membrane may be seen, in which there is a gap between the first support fiber mat 121 and the second support fiber mat 123, and the ion exchangeable component fills the gap. Further, the component of the ion exchange layer interposed between the first support fiber mat 121 and the second support fiber mat 123 is not necessarily the first ion exchangeable component 122a and may be the second ion exchange component 124, and it is not particularly limited in the present invention from which step of the preparation process the ion exchange layer originates.

Further, as shown in FIG. 12, the ion exchangeable components which fill in the second support fiber mat 123 may not all be the second ion exchangeable component 124, and the ion exchangeable components which fill in the lower surface portion of the second surface portion 123 may be the first ion exchangeable component 122a.

Further, in the ion exchange membrane according to the third preferred embodiment of the present invention, at least one support fiber mat in the plurality of support fiber mats may include a web region having a three-dimensional network structure formed by fusing fibers, which is shown in the description of FIG. 4 described above.

Further, the average diameter of the support fiber included in the support fiber mats 121 and 123 may be in the range of 0.1 to 100 μm. When the diameter of the support fiber is less than 0.1 μm, the mechanical strength is lowered and their function as the support fiber may not be properly performed, and the spinnability may be lowered. Further, when the diameter is more than 100 μm, the support fiber is not easily melted when the support fiber is melted by applying heat and pressure according to the purpose of the prepared ion exchange membrane, and accordingly, the adjustment of the pore diameter of the support fiber mats may not be easy. However, the diameter is not limited the above-described range diameter of the support fibers, and the fiber diameter range may be changed according to the purpose of the ion exchange membrane.

An average pore diameter of a single support fiber mat of the support fiber mats 121 and 123 may be in the range of 0.1 to 10 μm. When the average pore diameter is less than 0.1 μm, there may be a problem in that flux is significantly reduced during use in a filter. Further, when the average pore diameter is more than 10 μm, filtration efficiency may be lowered during use in a filter. However, the average pore diameter is not limited to the above-described average pore diameter range, and may vary according to the purpose of the ion exchange.

Further, the thickness of the single support fiber mat in the support fiber mats 121 and 123 is preferably in the range of 0.1 to 200 μm. When the thickness is less than 0.1 μm, the mechanical properties may be significantly reduced. When the thickness is more than 200 μm, there may be a problem in that manufacturing costs increase, and the volume of the ion exchange membrane become large such that the amount of the ion exchange membrane provided in the limited space is reduced.

Further, the total weight of each of the support fiber mat and the ion exchangeable component may be in a weight ratio of 1:0.5 to 0.9 so that they may be more suitable for satisfying the desired physical properties, and in particular, mechanical strength is secured to satisfy durability, and both the filtration efficiency and the energy efficiency may be satisfied for use in a separator. When the weight ratio of the support fiber mat and the ion exchangeable component is less than 1:0.5, filtration efficiency or energy efficiency may not be achieved to the desired level. Further, when the weight ratio of the support fiber mat and the ion exchangeable component is more than 1:0.9, the mechanical strength, durability, or the like may be lowered.

The above-described ion exchange membrane according to one embodiment of the present invention may be implemented in a battery separator including the ion exchange membrane.

The battery separator may include an ion exchange membrane itself, or may include other conventional structures provided for the battery separator. As an example thereof, a separate support member such as a nonwoven fabric may be further included on one surface of the ion exchange membrane for reinforcement of mechanical strength. The support member may be, for example, any one of a nonwoven fabric formed of a PP/PE fiber having a dual structure consisting of a core in which the outer periphery of a PP fiber is coated with PE, and a PET nonwoven fabric formed of a polyethylene terephthalate (PET) fiber and a cellulose fiber, but is not limited thereto. The basis weight, thickness and the like of the nonwoven fabric may be changed according to purpose, and are not particularly limited in the present invention.

Further, the battery separator may have a porosity of 5% or less, preferably 3% or less, and more preferably 1% or less, and still more preferably may have a porosity of 0%. The ion exchange membrane having a significantly low porosity or no pores as described above may be very suitable for a battery separator due to satisfying the mechanical properties and electrical properties required by a battery separator of a fuel cell, a redox flow battery, or the like.

Further, the battery separator according to one preferred embodiment of the present invention may be applied to a fuel cell or a redox flow battery having the battery separator. Here, in addition to the battery separator, other configurations of the fuel cell or the redox flow battery may employ an existing configuration, and thus are not particularly limited in the present invention, and description of existing configurations is omitted.

Further, according to purpose, the fiber mat and/or the nonwoven fabric may be coated or filled with an inorganic material. The inorganic material may be one or more metals selected from the group consisting of nickel (Ni), copper (Cu), stainless steel (SUS), titanium (Ti), chromium (Cr), manganese (Mn), iron (Fe), cobalt (Co), zinc (Zn), molybdenum (Mo), tungsten (W), silver (Ag), gold (Au) and aluminum (Al), or oxides thereof, and the like.

The present invention will now be described more specifically with reference to the following examples. However, the following examples should not be construed as limiting the scope of the present invention, and should be construed to facilitate understanding of the present invention.

EXAMPLES

Example 1

First, 12 g of polyvinylidene fluoride (Arkema Inc., Kynar 761) as a support fiber producing component was added to 88 g of a mixture of dimethylacetamide and acetone at a weight ratio of 90:10, and then dissolved at a temperature of 60° C. for 6 hours using a magnetic bar to prepare a mixed solution. Next, in order to prepare an ion exchange fiber spinning solution, 12 g of an APS (polystyrene:vinylbenzene chloride:methyl methacrylate=1:1:2) resin, which was an anion exchange resin, was dissolved in 88 g of dimethylacetamide at a temperature of 60° C. for 6 hours using a magnetic bar to prepare a mixed solution. The spinning solutions were respectively injected into two solution tanks of the electrospinning device. The support fiber spinning solution was discharged at a rate of 15 μl/min/hole, and the ion exchange fiber producing component was discharged at a rate of 10 μl/min/hole. Here, the temperature of the spinning section was maintained at 28° C., the humidity was maintained at 45%, and the distance between the collector and the spinning nozzle tip was set to 25 cm.

A voltage of 45 kV or more was applied to each spin nozzle pack using two high-voltage generators, an air pressure of 0.05 MPa was applied per spin nozzle pack, and spinning was performed as shown in FIG. 1 to prepare a laminate having a thickness of 100 μm, in which the support fiber mat and the ion exchange fiber mat were stacked to have a structure of a first support fiber mat/first ion exchange fiber mat/second support fiber mat/second ion exchange fiber mat. Here, the laminate was prepared so that the weight ratio of the total support fiber mats and the total ion exchange fiber mats included in the laminate was 1:1, the thickness of the single support fiber mat and the single ion exchange fiber mat was 33 μm and 17 μm, respectively, and the thickness ratio was 1:0.51. Next, to dry the solvent and moisture remaining on the stacked fiber mat, heat at a temperature of 140° C. and a pressure of 1 kgf/cm² were applied to perform a calendering process, and thereby an ion exchange membrane having a total thickness of 95 μm and a porosity of 60% as shown in the following Table 1 was prepared.

Example 2 to 8

An ion exchange membrane as shown in the following Table 1 or 2 was prepared in the same manner as in Example 1 except that the weight ratio of the support fibers and the ion exchange fibers provided in the ion exchange membrane, and the thickness ratio of the single fiber mat were changed as shown in the following Table 1 or 2.

Comparative Example 1

An ion exchange membrane as shown in the following Table 2 was prepared in the same manner as in Example 1 except that the support fiber spinning solution was not spun, and only the ion exchange fiber spinning solution was spun.

Comparative Example 2

An ion exchange membrane as shown in the following Table 2 was prepared in the same manner as in Example 1 except that a support fiber mat having a total thickness of 100 μm was prepared by spinning the support fiber spinning solution, a calendaring process was performed under the same conditions as in Example 1 to prepare a support membrane having a thickness of 95 μm. The support membrane was immersed for 1 hour in a mixed solution, which was prepared by dissolving 8 g of an APS (polystyrene: vinylbenzene chloride:methyl methacrylate=1:1:2) resin as an anion exchange resin in 92 g of dimethylacetamide at a temperature of 60° C. for 6 hours using a magnetic bar, and was then dried at a temperature of 80° C.

Experimental Example 1

The following physical properties of the ion exchange membranes prepared in examples and comparative examples were evaluated and are shown in the following Tables 1 and 2.

1. Degree of Dimensional Change (%)

In order to evaluate the ion exchange membrane, the degree of dimensional change of the membrane was measured. Specifically, the prepared membrane was immersed in distilled water for 24 hours, and the volume ($V_{wet}$) of the wet film was measured, and the wet membrane was vacuum-dried at 120° C. for 24 hours to measure the volume ($V_{dry}$). The measured values were substituted into the following Mathematical Equation 1 to calculate the degree of dimensional change.

Degree of dimensional change(%)=$(V_{wet}-V_{dry})\times 100/V_{dry}$ [Mathematical Equation 1]

It can be seen that, the larger the degree of dimensional change, the lower the mechanical strength and durability.

2. Performance as Separator for Redox Flow Battery

After an ion exchange membrane having a surface area of 30 cm² was positioned at a center of a cell, a pair of carbon felt pieces (GF020, JMTG), a pair of graphite plates, a pair of collectors and an end plate were sequentially placed on both surfaces of the ion exchange membrane to prepare a redox flow battery, which included a charge/discharge device (WBCS 3000, WonAtech), a pump, a positive electrode electrolyte tank connected to one region of the cell divided by the ion exchange membrane, and a negative electrode electrolyte tank connected to another region of the cell. Here, the positive electrode electrolyte tank was filled with 40 ml of a solution containing 2.0 M of sulfuric acid and 1.0 M of vanadium oxysulfate, and the negative electrode electrolyte tank was filled with 40 ml of a solution containing 2.0 M of sulfuric acid and 1.0 M of V3+.

The battery was charged to 1.5V while a current density of 60 mA/cm² was maintained, and discharged to 1.0V at the same current density, and then performance during the charge/discharge cycle was measured.

Here, the energy efficiency in each cycle was calculated according to the following Mathematical Equation 2 by measuring the change in voltage over time in each cycle. On the basis of the energy efficiency of Example 1 being 100% on the 10$^{th}$ charge/discharge cycle, the relative energy efficiency of the remaining examples and comparative examples on the 10$^{th}$ charge/discharge are shown. Further, a cycle at which the energy efficiency was reduced by 2% compared to the energy efficiency at the first cycle of each of the examples and comparative examples is also shown.

$$\text{Energy Efficiency} = \frac{\int_0^t I_d V_d dt}{\int_0^t I_c V_c dt}$$ [Mathematical Equation 2]

(Energy Efficiency: Energy Efficiency, $I_d$: Discharge current amount, $I_c$: Charge current amount, V: Discharge voltage, $V_C$: Charge voltage, t: Charge time or Discharge time)

TABLE 1

|  | Example 1 | Example 2 | Example 3 | Example 4 | Example 5 | Example 6 |
|---|---|---|---|---|---|---|
| Thickness of single support fiber mat (μm) | 33 | 33 | 33 | 33 | 33 | 45 |
| Thickness of single ion exchange fiber mat (μm) | 17 | 17 | 17 | 17 | 17 | 5 |
| Weight ratio of support fiber mat:ion exchange fiber mat | 1:1 | 1:0.5 | 1:0.8 | 1:1.4 | 1:1.6 | 1:1 |
| Thickness ratio of support fiber mat:ion exchange fiber mat | 1:0.51 | 1:0.51 | 1:0.51 | 1:0.51 | 1:0.51 | 1:0.11 |
| Degree of dimensional change (%) | 3 | 2 | 2 | 6 | 15 | 1 |
| Energy efficiency (%) | 100 | 80 | 97 | 102 | 104 | 69 |
| Number (times) of cycles when energy efficiency was reduced by 2% | 802 | 846 | 825 | 760 | 594 | 863 |

TABLE 2

|  | Example 7 | Example 8 | Comparative Example 1 | Comparative Example 2 |
|---|---|---|---|---|
| Thickness of single support fiber mat (μm) | 29.4 | 26 | 0 | 100 |
| Thickness of single ion exchange fiber mat (μm) | 20.6 | 24 | 100 | 0 |

TABLE 2-continued

|  | Example 7 | Example 8 | Comparative Example 1 | Comparative Example 2 |
|---|---|---|---|---|
| Weight ratio of support fiber mat:ion exchange fiber mat | 1:1 | 1:1 | — | — |
| Thickness ratio of support fiber mat:ion exchange fiber mat | 1:0.7 | 1:0.92 | — | — |
| Degree of dimensional change (%) | 5 | 22 | 68 | 1 |
| Energy efficiency (%) | 105 | 110 | 22 | 92 |
| Number (times) of cycles when energy efficiency was reduced by 2% | 799 | 640 | 13 | 730 |

It can be confirmed from Tables 1 and 2 that, in the case of Comparative Example 1 in which the ion exchange membrane was prepared using only the ion exchange fiber, durability was poor because the degree of dimensional change was significantly larger than that of the examples, and the energy efficiency on the $10^{th}$ charge/discharge cycle was only 22%, in contrast to Example 1, and the efficiency was not maintained for a long time.

Further, it can be confirmed that, in the case of Comparative Example 2 in which the support fiber mat was filled with the ion exchange solution, the energy efficiency was lower than that of Example 1, and the energy efficiency maintenance duration became short. It is presumed that the support fiber mat not being 100-percent filled with the ion exchange solution is the reason why the energy efficiency of Comparative Example 2 was lower than that of Example 1.

Further, it can be confirmed that, among the examples, in the cases of Examples 2 and 5, in which each ratio of total support fiber mat weight to the total ion exchange fiber mat weight was out of the preferred range, the physical properties were worse than those of Example 1, and the physical properties of Examples 6 and 8, in which each ratio of single support fiber mat thickness to single ion exchange fiber mat thickness was out of the preferred range, were deteriorated even when the preferred range of the weight ratio was satisfied.

Example 9

First, 12 g of polyvinylidene fluoride (Arkema Inc., Kynar 761) as a support component was added to 88 g of a mixture of dimethylacetamide and acetone at a weight ratio of 90:10, and then dissolved at a temperature of 60° C. for 6 hours using a magnetic bar to prepare a first mixed solution. Next, 12 g of an APS (polystyrene:vinylbenzene chloride:methyl methacrylate=1:1:2) resin, which was an anion exchange resin, was dissolved in 88 g of dimethylacetamide at a temperature of 60° C. for 6 hours using a magnetic bar to prepare a second mixed solution. Thereafter, the first mixed solution and the second mixed solution were mixed again and stirred to prepare a spinning solution so that the ion exchangeable component was contained in an amount of 50 parts by weight based on 100 parts by weight of the support component. The spinning solution thus prepared was injected into a solution tank of the electrospinning device, and discharged at a rate of 15 μl/min/hole. Here, the temperature of the spinning section was maintained at 28° C., the humidity was maintained at 45%, and the distance between the collector and the spinning nozzle tip was set to 25 cm.

A voltage of 45 kV or more was applied to each spin nozzle pack using two high-voltage generators, an air pressure of 0.05 MPa was applied per spin nozzle pack, and spinning was performed as shown in FIG. 1 to prepare a fiber mat. Then, to dry the solvent and moisture remaining on the stacked fiber mat, heat at a temperature of 140° C. and a pressure of 1 kgf/cm² was applied to perform a calendering process, and thereby an ion exchange membrane having a total thickness of 95 μm and a porosity of 60% as shown in the following Table 3 was prepared.

Example 10 to 13

An ion exchange membrane as shown in the following Table 3 was prepared in the same manner as in Example 9 except that the contents of the support component and the ion exchangeable component in the spinning solution were changed as shown in the following Table 3.

Comparative Example 3

An ion exchange membrane as shown in the following Table 3 was prepared in the same manner as in Example 9 except that the support component was not contained in the spinning solution.

Comparative Example 4

In order to prepare a support fiber, 12 g of polyvinylidene fluoride (Arkema Inc., Kynar 761) as a support fiber producing component was added to 88 g of a mixture of dimethylacetamide and acetone at a weight ratio of 90:10, and then dissolved at a temperature of 60° C. for 6 hours using a magnetic bar to prepare a spinning solution. The spinning solution was injected into a solution tank of the electrospinning device, and discharged at a rate of 15 μl/min/hole. Here, the temperature of the spinning section was maintained at 28° C., the humidity was maintained at 45%, and the distance between the collector and the spinning nozzle tip was set to 25 cm. A voltage of 45 kV or more was applied to each spin nozzle pack using two high-voltage generators, an air pressure of 0.05 MPa was applied per spin nozzle pack, and spinning was performed as shown in FIG. 1 to prepare a fiber mat. Then, to dry the solvent and moisture remaining on the stacked fiber mat, heat at a temperature of 140° C. and a pressure of 1 kgf/cm² were applied to perform a calendering process, and thereby a support membrane having a total thickness of 95 μm was formed. Thereafter, the support membrane was immersed for 1 hour in a mixed solution, which was prepared by dissolving 8 g of an APS (polystyrene:vinylbenzene chloride: methyl methacrylate=1:1:2) resin as an anion exchange resin in 92 g of dimethylacetamide at a temperature of 60° C. for 6 hours using a magnetic bar, and was then dried at a temperature of 80° C.

Experimental Example 2

The following physical properties of the ion exchange membranes prepared in Examples 9 to 13 and Comparative Examples 3 to 4 were evaluated and are shown in the following Table 3.

Here, the degree of dimensional change and the separator performance of the redox flow battery were evaluated in the same manner as the evaluation method of Experimental Example 1. As for the energy efficiency during performance as a separator, the relative energy efficiency of Examples 10 to 13 and Comparative Examples 3 to 4 are shown based on Example 9.

1. Spinnability

SEM photographs were taken at a magnification of 2000× with respect to the surface of the spun fiber mat, the total number of fibers and the number of beads were counted on the photographed image, and then spinnability was calculated according to the following Mathematical Equation 3.

Spinnability(%)=(Total number of fibers−Number of beads)×100/Total number of fibers  [Mathematical Equation 3]

solution was discharged at a rate of 15 μl/min/hole, and the ion exchange solution was discharged at a rate of 10 μl/min/hole. Here, the temperature of the spinning section was maintained at 28° C., the humidity was maintained at 45%, and the distance between the collector and the spinning nozzle tip was set to 25 cm.

A voltage of 45 kV or more was applied to each spin nozzle pack using two high-voltage generators, an air pressure of 0.05 MPa was applied per spin nozzle pack, and spinning was performed as shown in FIG. 1 to prepare a laminate having a structure of a first support fiber mat/

TABLE 3

|  |  | Example 9 | Example 10 | Example 11 | Example 12 | Example 13 | Comparative Example 3 | Comparative Example 4 |
|---|---|---|---|---|---|---|---|---|
| Spinning solution | Content of support component (parts by weight) | 100 | 100 | 100 | 100 | 100 | 0 | 100 |
|  | Content of ion exchangeable component (parts by weight) | 50 | 10 | 25 | 75 | 90 | 100 | 0 |
| Ion exchange membrane | Degree of dimensional change (%) | 9 | 2 | 4 | 12 | 25 | 68 | 1 |
|  | Spinnability (%) | 99 | 100 | 100 | 96 | 78 | 76 | 100 |
|  | Energy efficiency (%) | 100 | 46 | 78 | 106 | 110 | 25 | 109 |
|  | Number (times) of cycles when energy efficiency was reduced by 2% | 716 | 902 | 705 | 658 | 493 | 14 | 730 |

As can be seen from Table 3, in the case of Comparative Example 3, in which the ion exchange membrane was prepared using only the ion exchange fiber, the degree of dimensional change was significantly larger than those of the examples, the energy efficiency on the $10^{th}$ charge/discharge cycle was only 25%, in contrast to Example 9, and the energy efficiency was not maintained for a long time.

Further, it can be confirmed that, in the case of Comparative Example 4, which was a conventional ion exchange membrane having a support membrane filled with an ion exchange solution, the physical properties are slightly superior to those of Example 9, but a separate immersion time was required, and thus Example 9 is better in productivity.

Further, it can be confirmed that, among examples, in the cases of Examples 10 and 13 in which the content of the ion exchangeable component in the spinning solution was excessively small or excessively large, it is difficult to simultaneously satisfy all of the physical properties, in contrast to Example 9.

Example 14

First, in order to prepare a spinning solution for preparing a support fiber mat, 12 g of polyvinylidene fluoride (Arkema Inc., Kynar 761) as a support fiber producing component was added to 88 g of a mixture of dimethylacetamide and acetone at a weight ratio of 90:10, and then dissolved at a temperature of 60° C. for 6 hours using a magnetic bar to prepare a mixed solution. Next, in order to prepare an ion exchange solution, 8 g of an APS (polystyrene:vinylbenzene chloride:methyl methacrylate=1:1:2) resin as an anion exchange resin was dissolved in 92 g of dimethylacetamide at a temperature of 60° C. for 6 hours using a magnetic bar to prepare a mixed solution. The spinning solution and the ion exchange solution were respectively injected into two solution tanks of the electrospinning device. The spinning sprayed first ion exchange solution/second support fiber mat/sprayed second ion exchange solution. Here, the ratio of total support fiber mat weight to the total weight of ion exchangeable component included in the laminate was 1:0.67. Next, to dry the solvent and moisture remaining on the laminate, heat at a temperature of 140° C. and a pressure of 1 kgf/cm² were applied to perform a calendering process, and thereby an ion exchange membrane having a total thickness of 95 μm as shown in the following Table 4 was prepared.

Example 15 to 18

The ion exchange membrane was prepared in the same manner as in Example 14 except that the weight ratio of the support fiber mat and the ionic component provided in the ion exchange membrane was changed as shown in the following Table 4.

Comparative Example 5

An ion exchange membrane was prepared in the same manner as in Example 14 except that the support fiber spinning solution was not spun, and that only the ion exchange solution was spun to prepare an ion exchange membrane as shown in the following Table 4. Here, a mixed solution formed by dissolving 12 g of APS in 88 g of dimethylacetamide was used as the dimethylacetamide.

Comparative Example 6

An ion exchange membrane as shown in the following Table 4 was prepared in the same manner as in Example 14 except that a support fiber mat having a total thickness of 100 μm was prepared by spinning the support fiber spinning solution, a calendaring process was performed under the same conditions as in Example 14 to prepare a support membrane having a thickness of 95 µm, and then the support membrane was immersed for 1 hour in a mixed solution, which was prepared by dissolving 8 g of an APS (polystyrene:vinylbenzene chloride:methyl methacrylate=1:1:2) resin as an anion exchange resin in 92 g of dimethylacetamide at a temperature of 60° C. for 6 hours using a magnetic bar, and was then dried at a temperature of 80° C.

Experimental Example 3

Performance as a separator for a redox flow battery was evaluated, according to the method according to Experimental Example 1, using the ion exchange membranes prepared in Examples 14 to 18 and Comparative Examples 5 to 6 and are shown in the following Table 4. Here, on the basis of the energy efficiency of Example 14 being 100% on the 10$^{th}$ charge/discharge cycle, the relative energy efficiency of the remaining ion exchange membranes according to Examples 15 to 18 and Comparative Examples 5 to 6 are shown.

TABLE 4

|  | Example 14 | Example 15 | Example 16 | Example 17 | Example 18 | Comparative Example 5 | Comparative Example 6 |
|---|---|---|---|---|---|---|---|
| Total support fiber mats:total ion exchangeable component (weight ratio) | 1:0.67 | 1:0.45 | 1:0.52 | 1:0.85 | 1:0.92 | 0 | 100 |
| Energy efficiency (%) | 100 | 82 | 95 | 104 | 104 | 23 | 97 |
| Number (times) of cycles when energy efficiency was reduced by 2% | 735 | 760 | 756 | 718 | 675 | 13 | 730 |

It can be confirmed from Table 4 that, in the case of Comparative Example 5 in which the ion exchange membrane was prepared using only the ion exchange fiber, the energy efficiency at of the 10$^{th}$ charge/discharge cycle was only 23%, in contrast to Example 14, and the efficiency was not maintained for a long time.

Further, it can be confirmed that, in the case of Comparative Example 6, which was a conventional ion exchange membrane having a support membrane filled with an ion exchange solution, the physical properties are slightly superior to those of Example 14, but a separate immersion time was required, and thus Example 14 is better in productivity.

Further, it can be confirmed that, among examples, in the case of Examples 15 and 18, in which the content of the ion exchangeable component was excessively small or excessively large based on the total weight of the fiber mat, energy efficiency and energy efficiency maintenance were poor, in contrast to Example 14.

Although certain embodiments of the present embodiment have been described, it shall be appreciated that the technical ideas of the present invention is not restricted to the described embodiments and that other embodiments are possible within the same or equivalent technical ideas by those skilled in the art to which the present invention pertains by adding, modifying, deleting and supplementing the elements.

The invention claimed is:

1. A redox flow battery separator, comprising:
   at least one ion exchange fiber mat; and
   at least one support fiber mat,
   wherein the at least one support fiber mat and the at least one ion exchange fiber mat are accumulated such that one of the support fiber mat and the ion exchange fiber mat lies on the other,
   wherein the weight ratio of the at least one support fiber mat to the at least one ion exchange fiber mat ranges from 1:0.8 to 1:1.4,
   wherein the thickness ratio of a single support fiber mat to a single ion exchange fiber mat ranges from 1:0.2 to 1:0.8, and
   wherein the support fiber mat has an average pore diameter of 0.1 µm to 10 µm and the ion exchange fiber mat has an average pore diameter of 0.1 µm to 1 µm.

2. The redox flow battery separator of claim 1, having:
   a degree of dimensional change (%) of 2 to 6 as calculated by Equation 1

$$\text{degree of dimensional change}(\%)=(V_{wet}-V_{dry})\times 100/V_{dry},$$

where $V_{wet}$ is the volume of the ion exchange membrane that has been immersed in distilled water for 24 hours, and $V_{dry}$ is the volume of the ion exchange membrane that has been vacuum-dried at 120° C. for 24 hours; and
   an energy efficiency (%) of 97 to 105 as calculated by Equation 2:

$$\text{energy efficiency} = \frac{\int_0^t I_d V_d dt}{\int_0^t I_c V_c dt}$$

where $I_d$ is discharge current amount, $I_c$ is charge current amount, $V_d$ is discharge voltage, $V_C$ is charge voltage, t is charge time or discharge time.

3. A method for manufacturing a redox flow battery separator, the method comprising:
   electrospinning each of a support fiber producing solution and an ion exchange fiber producing solution at least once such that one of an ion exchange fiber mat in which ion exchange fibers are accumulated and a support fiber mat in which support fibers are accumulated lies on the other to obtain the redox flow battery separator,
   wherein the weight ratio of the support fiber mat to the ion exchange fiber mat ranges from 1:0.8 to 1:1.4,
   wherein the support fiber mat has an average pore diameter of 0.1 µm to 10 µm and the ion exchange fiber mat has an average pore diameter of 0.1 µm to 1 µm, and
   wherein the thickness ratio of a single support fiber mat to a single ion exchange fiber mat ranges from 1:0.2 to 1:0.8.

4. The method according to claim 3, wherein the ion exchange fiber producing solution comprises a first ion exchange fiber producing solution containing a cationic ion exchange fiber producing component and a second ion exchange fiber producing solution containing an anionic ion exchange fiber producing component, wherein the first and second ion exchange fiber producing solutions are each electrospun to form separate ion exchange fiber mats that are adjacent to each other.

5. The method of claim 3, wherein the redox flow battery separator has:

a degree of dimensional change (%) of 2 to 6 as calculated by Equation 1

$$\text{degree of dimensional change}(\%) = (V_{wet} - V_{dry}) \times 100 / V_{dry},$$

where $V_{wet}$ is the volume of the ion exchange membrane that has been immersed in distilled water for 24 hours, and $V_{dry}$ is the volume of the ion exchange membrane that has been vacuum-dried at 120° C. for 24 hours; and an energy efficiency (%) of 97 to 105 as calculated by Equation 2:

$$\text{energy efficiency} = \frac{\int_0^t I_d V_d dt}{\int_0^t I_c V_c dt}$$

where $I_d$ is discharge current amount, $I_c$ is charge current amount, $V_d$ is discharge voltage, $V_C$ is charge voltage, t is charge time or discharge time.

* * * * *